US 12,549,325 B2

(12) United States Patent
Swaminathan et al.

(10) Patent No.: US 12,549,325 B2
(45) Date of Patent: Feb. 10, 2026

(54) TIME SYNCHRONIZATION WITH MULTI-CHASSIS LINK AGGREGATION

(71) Applicant: HEWLETT PACKARD ENTERPRISE DEVELOPMENT LP, Spring, TX (US)

(72) Inventors: Venkatachalam Swaminathan, Bangalore (IN); Jagmeet Singh Hanspal, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 142 days.

(21) Appl. No.: 18/510,958

(22) Filed: Nov. 16, 2023

(65) Prior Publication Data
US 2025/0105997 A1    Mar. 27, 2025

(30) Foreign Application Priority Data
Sep. 26, 2023 (IN) .............................. 202341064473

(51) Int. Cl.
*H04L 7/00*    (2006.01)
(52) U.S. Cl.
CPC .................................. *H04L 7/0008* (2013.01)
(58) Field of Classification Search
CPC ........................ H04L 7/0008; H04L 12/40013
USPC .......................... 375/356, 354, 362, 371, 373
See application file for complete search history.

(56) References Cited

U.S. PATENT DOCUMENTS

2021/0328697 A1* 10/2021 Budnik ............. H04L 12/40013
2025/0096918 A1    3/2025 Rengarajan et al.

OTHER PUBLICATIONS

Aruba, "AOS-CX 10.10 Fundamentals Guide 8320, 8325, 8360, 9300, 10000 Switch Series", Edition: 2, Feb. 2022, 331 Pages.
Aruba, AOS-CX 10.12 Virtual Switching Extension (VSX) Guide 6400, 8100, 8320, 8325, 8360, 8400, 9300, 10000 Switch Series, Published Aug. 2023 (237 pages).
Aruba, High Availability from Campus to Data Center, Aruba Virtual Switching Extension (VSX) downloaded Aug. 23, 2023 (4 pages).
Hewlett Packard Enterprise, DRNI ISSU technology, Technical white paper, downloaded Aug. 23, 2023 (22 pages).
Hewlett Packard Enterprise, Virtual Switching Framework (VSF), 2016 (2 pages).
Hewlett Packard Enterprise, VSF downloaded Aug. 23, 2023 (2 pages).
Hpe, "AOS-CX 10.10 Virtual Switching Extension (VSX) Guide 6400, 8320, 8325, 8360, 8400, 9300, 10000 Switch Series", Edition: 3, Feb. 2023, 2 Pages.

(Continued)

*Primary Examiner* — Phuong Phu
(74) *Attorney, Agent, or Firm* — Hewlett Packard Enterprise Patent Department

(57) ABSTRACT

In some examples, a system provides multi-chassis link aggregation by the first and second electronic devices that are part of a logical device supporting an MCLAG, where the first electronic device includes a first time clock, and the second electronic device includes a second time clock. The first and second time clocks perform, over a link between the first and second electronic devices of the logical device, a clock source selection process to select one of the first and second time clocks as a clock source and another one of the first and second time clocks as a clock sink as part of a time synchronization process in the system.

17 Claims, 11 Drawing Sheets

(56) References Cited

OTHER PUBLICATIONS

IEEE, "IEEE Standard for Local and Metropolitan Area Networks", 2020, 333 Pages.
IEEE, "IEEE Standard for a Precision Clock Synchronization Protocol for Networked Measurement and Control Systems", 2008, 189 pages.
Juniper Networks, Junos® OS, Multichassis Link Aggregation User Guide for Routing and Switching Devices, published Jun. 12, 2023 (560 pages).
Wikipedia, Multi-chassis link aggregation group downloaded Aug. 23, 2023 (4 pages).

* cited by examiner

TIME SYNCHRONIZATION WITH MULTI-CHASSIS LINK AGGREGATION

BACKGROUND

An electronic device in a distributed system of electronic devices includes a time clock that produces time, which can be wall-clock time or any other representation of time. Times produced by the time clocks in multiple electronic devices allows transactions occurring across the multiple electronic devices to be time-aligned with one another.

BRIEF DESCRIPTION OF THE DRAWINGS

Some implementations of the present disclosure are described with respect to the following figures.

Figure 1:
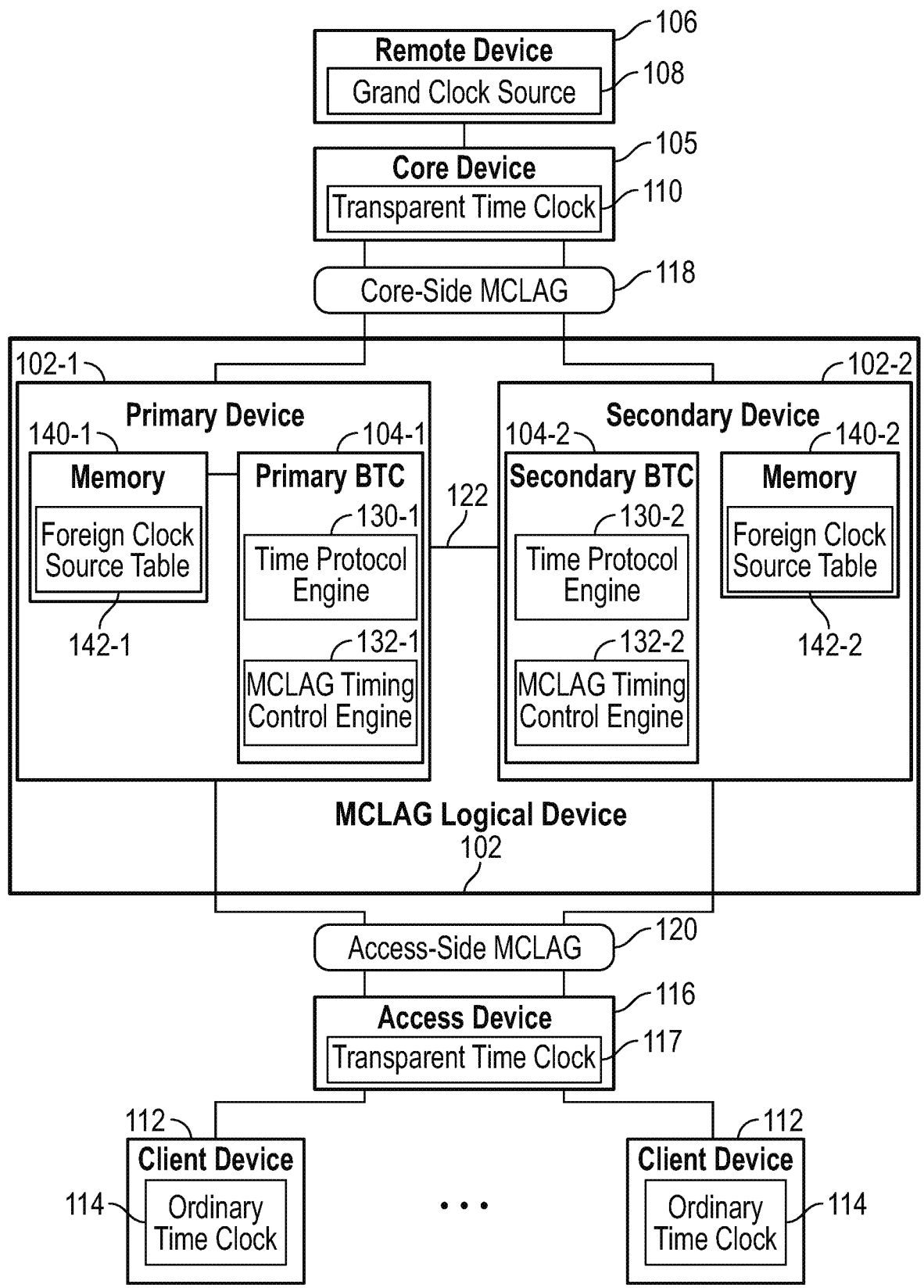
FIG. 1 is a block diagram of an arrangement that includes a multi-chassis link aggregation group (MCLAG) logical device connected to various other electronic devices, according to some examples.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

To maintain synchronization among time clocks (or more simply, "clocks") in electronic devices of a distributed system, a time synchronization process can be employed. In some examples, the time synchronization process can be according to a time synchronization protocol such as the Precision Time Protocol (PTP) described by an Institute of Electrical and Electronics Engineers (IEEE) 1588 Specification.

The distributed system can include a network to interconnect the electronic devices. The network includes physical network links (or more simply "network links") between electronic devices. In some cases, link aggregation can be employed in which multiple network links are aggregated into a logical link (sometimes referred to as a link aggregation group or LAG) between electronic devices. In some examples, link aggregation can be according to an IEEE 802.3ad Specification. Link aggregation allows for packets to be load balanced across the network links of a LAG between two electronic devices. With load balancing, a source electronic device can use different network links of the LAG to send different packets to a target electronic device.

Multi-chassis link aggregation provides a logical LAG between an electronic device and plural (e.g., two or greater than two) multi-chassis link aggregation group (MCLAG) peer devices, such as switches. The plural MCLAG peer devices form an "MCLAG logical device" that appears as a single device to other electronic devices, where the MCLAG logical device presents a LAG with multiple network links. A given electronic device is connected over the logical LAG to the plural MCLAG peer devices, and any network link of the logical LAG (also referred to as the MCLAG) can be used for communications by the given electronic device. The plural MCLAG peer devices are in separate chassis, where "chassis" can refer to any physical boundary or delineation. Electronic devices in separate chassis are physically separate devices that can run independently of one another, such that one of the electronic devices can continue to operate even if another one of the electronic devices is nonfunctional. MCLAG provides redundancy and load balancing between the plural MCLAG peer devices.

PTP employs timing messages exchanged between electronic devices (or more specifically, between clocks of the electronic devices) to perform time synchronization. Implementing the time synchronization protocol such as PTP in a multi-chassis link aggregation environment may produce inaccurate results due to various issues associated with timing messages of the time synchronization protocol exchanged in the multi-chassis link aggregation environment. The following refers to a multi-chassis link aggregation environment that includes a primary device and a secondary device, which are peer devices of an MCLAG logical device. Issues may arise from communicating timing messages of the time synchronization protocol with the primary and secondary devices of the MCLAG logical device. For example, some issues are associated with the primary and secondary devices sending redundant messages of the time synchronization protocol, which may cause confusion at an electronic device receiving the redundant messages. Further issues are associated with successive different messages of the time synchronization protocol arriving at different ones of the primary and secondary devices. For example, a first timing message of a time synchronization process may arrive at the primary device of the MCLAG logical device, while a second timing message of the time synchronization process may arrive at the secondary device of the MCLAG logical device. The secondary device may improperly handle the second timing message (e.g., drop the second timing message) if the secondary device determines it did not previously receive the first timing message.

In accordance with some implementations of the present disclosure, an MCLAG logical device that includes first and second electronic devices with respective first and second time clocks are able to perform, between the first and second time clocks over a link between the first and second electronic devices of the MCLAG logical device, a clock source selection process to select one of the first and second time clocks as a clock source and another one of the first and second time clocks as a clock sink. A clock source provides a time reference for a time clock of another electronic device. A clock sink uses a time clock of another electronic device as a reference. According to PTP, the clock source is a master clock, and the clock sink is a slave clock. The first electronic device of the MCLAG logical device may be the primary device of the MCLAG logical device, and the second electronic device of the MCLAG logical device may be the secondary device of the MCLAG logical device (or vice versa). In other examples, an MCLAG logical device may include more than two electronic devices with corresponding time clocks.

In further examples, the first and second time clocks in the MCLAG logical device are boundary time clocks. More specifically, the MCLAG logical device includes a first boundary time clock (in the first electronic device) and a second boundary time clock (in the second electronic device). A "boundary time clock" (or more simply, a "boundary clock") refers to a time clock in an electronic device that synchronizes to a clock source that is upstream of the boundary time clock and acts as a clock source to a clock sink downstream of the boundary time clock. In response to a first boundary time clock of the MCLAG logical device receiving a first timing message from a clock sink, the first boundary time clock determines whether the second boundary time clock is a clock source for the first boundary time clock, and based on determining that the second boundary time clock is the clock source for the first boundary time clock, the first boundary time clock forwards the first timing message to the second boundary time clock. In additional examples, in response to the first boundary time clock of the MCLAG logical device receiving a second timing message from a clock source, the first boundary time clock checks a data structure for the second boundary time clock to determine whether the second boundary time clock has received a third timing message from the clock source, and based on determining that the second boundary time clock has received the third timing message from the clock source, the first boundary time clock forwards the second timing message to the second boundary time clock.

Specific Issues of an Mclag Logical Device in Relation to Timing Synchronization Processes The following further describes five issues (Issue 1, Issue 2, Issue 3, Issue 4, and Issue 5) that may be encountered by an MCLAG logical device in relation to timing synchronization processes, such as PTP processes. The discussion refers to FIG. 1, which depicts an example arrangement that includes an MCLAG logical device 102 that has a primary device 102-1 and a secondary device 102-2. Examples of the primary and secondary devices 102-1 and 102-2 include switches, routers, or other types of network devices through which data can be passed and forwarded in a network. Although referred to as "primary" and "secondary" devices, note that the devices 102-1 and 102-2 of the MCLAG logical device 102 are both active (e.g., operate in an active-active configuration) and support communications with other electronic devices.

In examples according to FIG. 1, the MCLAG logical device 102 is part of an aggregation layer that performs link aggregation. In some examples, the MCLAG logical device 102 is according to a Distributed Resilient Network Interconnect (DRNI) model. DRNI virtualizes two physical devices (two MCLAG peer devices) into one logical device through multi-chassis link aggregation to provide node redundancy, link redundancy, and load sharing. DRNI is described by an IEEE 802.1AXbq Specification. Examples of electronic devices that can operate in a manner that is consistent with DRNI are virtual switch extension (VSX) switches provided by Hewlett Packard Enterprise (HPE). The VSX switches are examples of the primary and secondary devices 102-1 and 102-2 of an MCLAG logical device. In other examples, the primary and secondary devices 102-1 and 102-2 may be from other vendors.

More generally, the MCLAG logical device 102 can be according to any technology in which multiple physical devices cooperate to provide a virtual entity that supports link aggregation.

The arrangement of FIG. 1 further includes a core device 105 between the MCLAG logical device 102 and a remote device 106. The remote device 106 may include an electronic device that is part of a cloud, an arrangement of one or more servers, a data center, or any other computing environment. The remote device 106 may include a grand clock source 108, which is a clock source with a higher clock quality (than other clocks in the arrangement of FIG. 1) and which may have direct access to a reference clock. The reference clock may include a high frequency oscillator, a Global Positioning System (GPS) clock, or any other time reference. According to PTP, the grand clock source is a grand master clock.

The primary device 102-1 includes a boundary time clock 104-1 (referred to as a "primary BTC 104-1"), and the secondary device 102-2 includes a boundary time clock 104-2 (referred to as a "secondary BTC 104-2"). The BTCs (boundary time clocks) 104-1 and 104-2 are synchronized to the grand clock source 108 (or another clock source in other examples).

The core device 105 includes a transparent time clock 110, which is an intermediate time clock that can calculate time delays but the transparent time clock does not synchronize to other time clocks. The core device 105 can be an electronic device that provides a bridge between the remote device 106 and the MCLAG logical device 102. For example, the core device 105 may include a gateway, a router, or any other type of intermediate device. In other examples, the core device 105 may be omitted. Although FIG. 1 shows one core device 105 between the remote device 106 and the MCLAG logical device 102, in other examples, there may be multiple core devices between the remote device 106 and the MCLAG logical device 102.

FIG. 1 further shows various client devices 112 that have ordinary time clocks 114. An ordinary time clock is a time clock that is not connected to any downstream time clock (i.e., the ordinary time clock does not act as a clock source for another time clock). A "client device" can refer to an electronic device that accesses a remote service in a system, such as services in a cloud, on a server, in a datacenter, or any other computing platform. The ordinary time clocks 114 are synchronized to the primary BTC 104-1 and/or the secondary BTC 104-2.

The arrangement of FIG. 1 further includes an access device 116 (or multiple access devices) to which the client devices 112 connect to access a remote service. For example, the access device 116 may include an access point (AP) of a wireless local area network (WLAN), a base station of a cellular network, or any other type of access device. The access device 116 includes a transparent time clock 117. In other examples, the access device 116 may be omitted, and the client devices 112 may connect to the primary and secondary devices 102-1 and 102-2 of the MCLAG logical device 102. In further examples, the time clock in the core device 105 and/or the access device 116 may be a boundary time clock or a grand clock source. More generally, the core device 105 and/or the access device 116 is a time synchronization protocol-aware device that supports a time synchronization process, such as a PTP process.

The MCLAG logical device 102 presents a core-side MCLAG 118 to the core device 105, and the MCLAG logical device 102 presents an access-side MCLAG 120 to the access device 116. The core-side MCLAG 118 includes a collection of network links that are connected to interfaces of the primary device 102-1 and the secondary device 102-2, and to interfaces of the core device 105. The access-side MCLAG 120 includes a collection of network links that are connected to interfaces of the primary device 102-1 and the secondary device 102-2, and to interfaces of the access device 116. The interfaces of a device are also referred to as "ports," and an interface may be connected to a respective network link of a LAG. Interfaces connected to network links of a LAG are referred to as "LAG interfaces" (or "LAG ports").

The MCLAG logical device 102 also includes an inter-device link 122 between the primary device 102-1 and the secondary device 102-2. If the primary and secondary devices 102-1 and 102-2 are switches, the inter-device link 122 may be referred to as an inter-switch link. The inter-device link 122 can refer to any communication path between the primary and secondary devices 102-1 and 102-2. The inter-device link 122 is used to exchange information of the primary and secondary devices 102-1 and 102-2. The primary and secondary devices 102-1 and 102-2 can also synchronization with one another over the inter-device link 122.

Figure 2B:
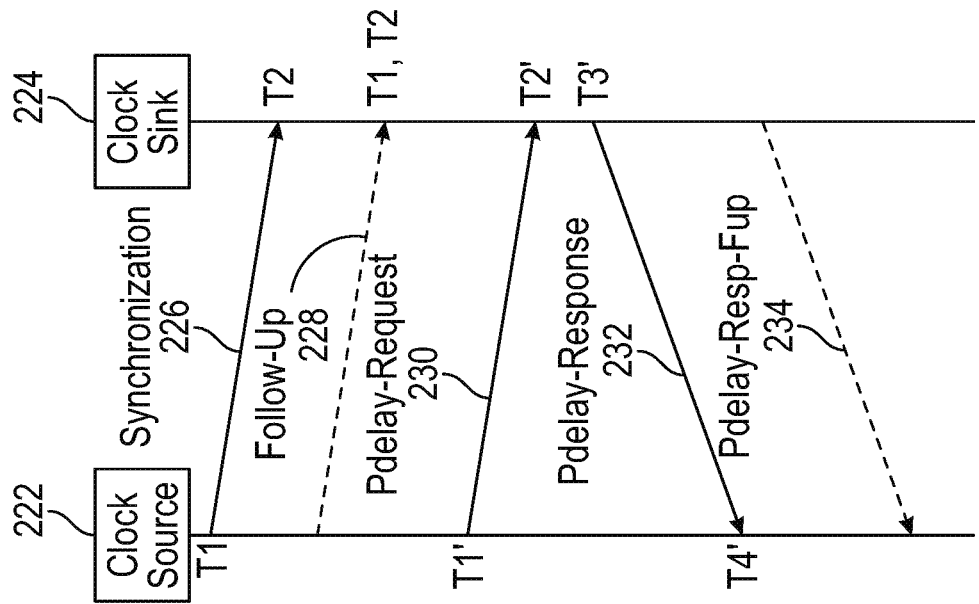
FIG. 2A and FIG. 2B are timing diagrams illustrating exchanges of timing messages according to a Precision Time Protocol (PTP), according to some examples.
Figure 2A:
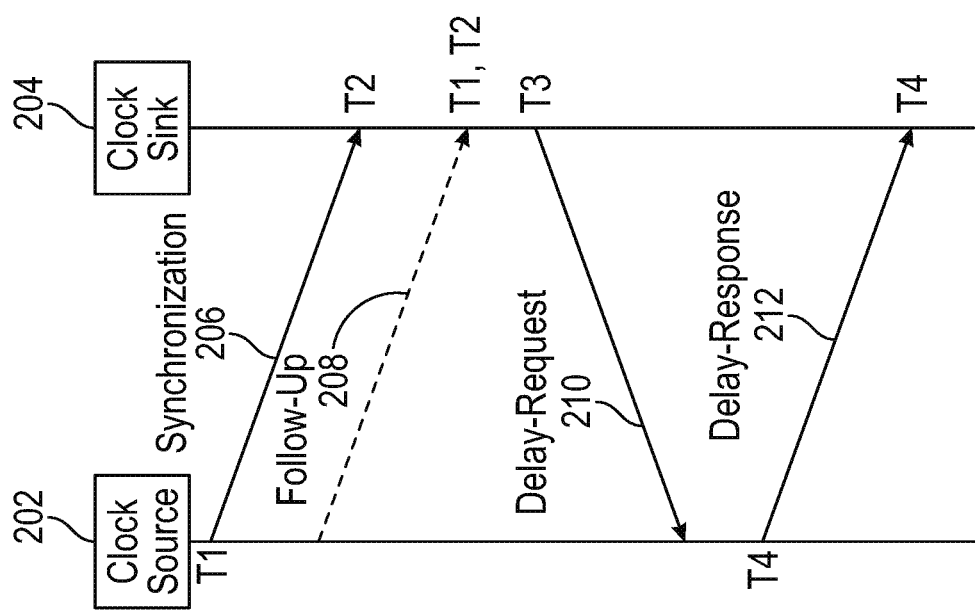

FIG. 2A is a timing diagram showing exchanges of PTP timing messages between a clock source 202 and a clock sink 204 that employ an end-to-and delay mechanism. FIG. 2B is a timing diagram showing exchanges of timing messages between a clock source 222 and a clock sink 224 that employ a peer-to-peer delay mechanism. The IEEE 1588 Specification describes the timing messages and how the timing messages are handled.

The timing messages of FIG. 2A include a synchronization message 206 (e.g., a PTP Sync message) sent from the clock source 202 to the clock sink 204. The synchronization message 206 is sent by the clock source 202 to the clock sink 204 to initiate a time synchronization process. The clock source 202 can record an egress time (T1), which is the time at which the synchronization message 206 was sent. If the clock source 202 is a one-step clock, then T1 can be carried in the synchronization message 206. If the clock source 202 is a two-step clock, then T1 is carried in a follow-up message 208 (PTP Follow-Up message) sent after the synchronization message 206. Upon receiving the synchronization message 206 (or if applicable the follow-up message), the clock sink 204 records an ingress time (T2) at which the clock sink 204 received the synchronization message 206. The clock sink 204 also records the egress time (T1) from the clock source 202, where T1 may be included in the synchronization message 206 or the follow-up message 208.

The clock sink 204 sends a delay-request message 210 (e.g., PTP DelayReq message) to the clock source 202. The clock sink 204 can record an egress time (T3) at which the delay-request message 210 was sent from the clock sink 204. The clock source 202 receives the delay-request message 210 and records an ingress time (T4) at which the delay-request message 210 was received at the clock source 202. The clock source 202 then sends a delay-response message 212 (e.g., PTP DelayResp) to the clock sink 204. The delay-response message 212 contains the ingress time (T4) of the delay-request message 210.

Using T1, T2, T3, and T4, the clock sink 204 is able to determine a time offset of the clock sink 204 relative to the clock source 202, such as using computations according to the PTP. The time offset refers to a difference in time between the clock source and the clock sink based on various delays between the clock source and the clock sink.

FIG. 2B illustrates exchanges of timing messages according to the peer-to-peer delay mechanism. A clock source 222 sends a synchronization message 226 to a clock sink 224 (and possibly a follow-up message 228 if the clock source is a two-step clock source). FIG. 2B further shows a Pdelay-request message 230 sent from the clock source 222 to the clock sink 224, which responds with a Pdelay-response message 232 from the clock sink 224 to the clock source 222 (and possibly a Pdelay-resp-fup message 234 if the clock sink 224 is a two-step clock). Details of a Pdelay-request message, a Pdelay-response message, and a Pdelay-resp-fup message are discussed in the PTP Specification.

In addition to the timing messages discussed above, prior to the exchanges of timing messages depicted in FIG. 2A and FIG. 2B, another timing message that is exchanged between time clocks is an announce message. An announce message contains quality attributes regarding a time clock that sent the announce message. For example, the quality attributes include a class, a priority, and/or a quality of the time clock. Announce messages exchanged between a first time clock and a second time clock can be used by the first and second time clocks to determine (based on a comparison of the quality attributes) which of the first and second time clocks is the clock source and which of the first and second time clocks is the clock sink.

The first time clock sends a first announce message to the second time clock, and the second time clock sends a second announce message to the first time clock. The first and second time clocks can implement a best clock source algorithm to select, based on the quality information in the first and second announce messages, which of the first and second time clocks is the clock source and which other one of the first and second time clocks is the clock sink. The best clock source algorithm of PTP is referred to as a Best Master Clock Algorithm (BMCA).

Issue 1

Issue 1 relates to a condition in which the boundary time clocks 104-1 and 104-2 of the respective primary and secondary devices 102-1 send redundant announce messages to a clock sink (e.g., an ordinary time clock 114 in a client device 112 or another clock sink). Issue 1 affects time clocks that employ either the end-to-end delay mechanism or peer-to-peer delay mechanism.

The grand clock source 108 generates an announce message that is sent via the transparent time clock 110 of the core device 105 to a boundary time clock (one of 104-1 and 104-2) of the MCLAG logical device 102. The core device 105 is connected over the core-side MCLAG 118 to the MCLAG logical device 102. The core device 105 can use a LAG hash algorithm on packet header content of the announce message to select which LAG interface connected to the MCLAG 118 to transmit the announce message. The announce message is in the form of a packet that contains a header and a payload. A "packet" can refer to a data packet that carries data or a control packet that carries control information. The payload carries data or control information, while the header includes fields used for forwarding of the packet in a network and for identifying information of one or more communication protocols associated with the packet.

A LAG hash algorithm involves the application of a hash function on certain fields of the header of a packet to derive a hash value, and the hash value is used to select from multiple LAG interfaces of a LAG. After the core device 105 has selected the LAG interface over which the announce message is to be sent over the core-side MCLAG 118, the core device 105 sends the announce message with an updated correction field through the selected LAG interface and over a network link of the MCLAG 118 to the primary device 102-1 or the secondary device 102-2 (dependent upon which LAG interface was selected). The correction field (e.g., the PTP CorrectionField) is updated with a resident time of the announce message in the transparent time clock 110 of the core device 105. The resident time is the difference between the egress time of the announce message (as sent to the MCLAG logical device 102) and the ingress time of the announce message (as received from the grand clock source 108).

In an example, it is assumed that the announce message is received at the primary device 102-1. The primary BTC 104-1 in the primary device 102-1 applies a best clock source algorithm using the announce message and chooses the grand clock source 108 as the clock source, such that the primary BTC 104-1 is the clock sink that uses the grand clock source 108 as a time reference. The primary device 102-1 indicates the LAG interface of the primary device 102-1 at which the announce message from the grand clock source 108 was received as a clock sink LAG interface.

The primary BTC 104-1 generates its announce message (updated with information of the grand clock source 108), and sends the announce message generated by the primary BTC 104-1 to the secondary device 102-2 and to downstream devices over the access-side MCLAG 120. The announce message generated by the primary BTC 104-1 is received by the client devices 112.

The secondary BTC 104-2 in the secondary device 102-2 receives the announce message from the primary device 102-1, and the secondary BTC 104-2 also generates its announce message (updated with information of the grand clock source 108). The secondary device 102-2 sends the announce message generated by the secondary BTC 104-2 to downstream devices over the access-side MCLAG 120. As a result, the client devices 112 may receive redundant announce messages (both containing information of the grand clock source 108) from the boundary time clocks 104-1 and 104-2. A client device receiving redundant announce messages associated with a common clock source raises Issue 1.

Issues 2 and 3

Issue 2 relates to a condition in which a boundary time clock of the

MCLAG logical device 102 does not properly handle a synchronization message or a follow-up message from a clock source (e.g., the grand clock source 108 or another clock source).

Issue 3 relates to a condition in which the boundary time clocks 104-1 and 104-2 of the MCLAG logical device 102 send redundant synchronization or follow-up messages to a clock sink (e.g., an ordinary time clock 114 in a client device 112 or another clock sink).

Issues 2 and 3 affect time clocks that employ either the end-to-end delay mechanism or peer-to-peer delay mechanism The grand clock source 108 sends a synchronization message after a best clock source algorithm based on announce messages has been performed to select a clock source and a clock sink between the grand clock source 108 and each of the boundary time clocks 104-1 and 104-2. If the grand clock source 108 is a two-step clock, the grand clock source 108 sends a follow-up message after the synchronization message. If the grand clock source 108 is a one-step clock, the grand clock source 108 does not send a follow-up message after the synchronization message.

The synchronization message from the grand clock source 108 passes through the transparent time clock 110 of the core device 105 to the MCLAG logical device 102. The transparent time clock 110 updates the correction field in the synchronization message with the resident time of the synchronization message through the transparent time clock 110.

If applicable, the follow-up message from the grand clock source 108 passes through the transparent time clock 110 of the core device 105 to the MCLAG logical device 102. The transparent time clock 110 does not update the correction field in the follow-up message, which is forwarded unmodified from the grand clock source 108 to the MCLAG logical device 102.

The core device 105 applies a LAG hash algorithm to select a LAG interface to transmit the synchronization message (and similarly applies a LAG hash algorithm to select a LAG interface to transmit the follow-up message, if applicable).

Continuing with the example discussed in connection with Issue 1, it is assumed that the announce message from the grand clock source 108 was received by the primary BTC 104-1, and thus the primary BTC 104-1 performed a best clock source algorithm with the grand clock source 108.

If the synchronization or follow-up message from the grand clock source 108 also arrives at the primary BTC 104-1, then no issue arises since the synchronization or follow-up message is received at the same primary BTC 104-1 as the announce message.

However, if the synchronization or follow-up message arrives at the secondary BTC 104-2, then the secondary BTC 104-2 may drop the synchronization or follow-up message as there is no matching announce message received by the secondary BTC 104-2 from the grand clock source 108. The dropping of the synchronization or follow-up message constitutes a mishandling of the synchronization or follow-up message, which raises Issue 2.

Note that in an example where the grand clock source 108 is a two-step clock, it is possible that the synchronization message from the grand clock source 108 is received by the primary BTC 104-1, but the follow-up message from the grand clock source 108 is received by the secondary BTC 104-2. In this case, the secondary BTC 104-2 may drop the follow-up message, which raises Issue 2. Alternatively, the synchronization message from the grand clock source 108 is received by the secondary BTC 104-2, but the follow-up message from the grand clock source 108 is received by the primary BTC 104-1. In this case, the primary BTC 104-1 may drop the follow-up message, which also raises Issue 2

After receiving the synchronization message or follow-up message from the grand clock source 108, each of the primary BTC 104-1 and the secondary BTC 104-2 will generate its own synchronization message or follow-up message. The primary and secondary BTCs 104-1 and 104-2 send the redundant synchronization messages or follow-up messages, which are received at the client devices 112. The presence of redundant synchronization messages or follow-up messages at a client device 112 can cause inaccurate time offset computations by the ordinary time clock 114 of the client device 112, which raises Issue 3.

Issues 4 and 5

Issue 4 relates to a condition in which a boundary time clock of the MCLAG logical device 102 does not properly handle a delay-response message from a clock source (e.g., the grand clock source 108 or another clock source).

Issue 5 relates to a condition in which a boundary time clock of the MCLAG logical device 102 does not properly handle a delay-request message from a clock sink (e.g., an ordinary time clock 114 in a client device 112 or another clock sink).

Issues 4 and 5 affect time clocks that employ the end-to-end delay mechanism.

Continuing with the examples discussed above in connection with Issues 1 to 3, it is assumed that a LAG interface of the primary device 102-1 has been identified as a clock sink interface. Assuming that the end-to-end delay mechanism is employed, the primary BTC 104-1 in the primary device 102-1 sends a delay-request message over the core-side MCLAG 118 towards the grand clock source 108. The delay-request is passed through the transparent time clock 110 of the core device 105, which updates the correction field of the delay-request with the resident time of the delay-request through the transparent time clock 110.

The grand clock source 108 receives the delay-request message, and in response to the delay-request message, the grand clock source 108 sends a delay-response message towards the MCLAG logical device 102. This delay-response message is passed through the transparent time clock 110 of the core device 105. Based on the LAG hash algorithm applied by the core device 105, the delay-response message may be sent through a selected LAG interface of the core device 105 connected to either the primary device 102-1 or the secondary device 102-2.

If the delay-response message arrives at the primary device 102-1, the primary BTC 104-1 is able to process the delay-response message since the primary BTC 104-1 sent the delay-request message to the grand clock source 108.

However, if the delay-response message arrives at the secondary device 102-2, then the secondary BTC 104-2 drops the delay-response message as there will be no matching delay-request sent from the secondary BTC 104-2. This raises Issue 4.

At a client device 112, after the ordinary time clock 114 in the client device 112 receives a synchronization message from a boundary time clock (either 104-1 or 104-2), the client device 112 indicates the LAG interface of the client device 112 that received the synchronization message as a clock source interface The ordinary time clock 114 in the client device 112 generates and sends a delay-request message on the LAG interface (the clock source interface) towards the MCLAG logical device 102 through the access device 116. The transparent time clock 117 in the access device 116 updates the correction filed of the delay-request message with the resident time through the transparent time clock 117. Additionally, the access device applies a LAG hash algorithm to select a LAG interface connected to the access-side MCLAG 120 to send the delay-request message with the updated correction field. Depending on which LAG interface of the access device 116 is selected by the LAG hash algorithm, the delay-request message may arrive at the primary device 102-1 or the secondary device 102-2. If the delay-request message arrives at the secondary device 102-2, the secondary BTC 104-2 may drop the delay-request message since no matching synchronization message is found at the secondary device 102-2. Alternatively, the secondary device 102-2 may respond to the delay-request message with a delay-response message. The ordinary time clock 114 in the client device 112 that receives the delay-response message may drop the delay-response message, since the ordinary time clock 114 was expecting the delay-response message from the primary device 102-1. The secondary device 102-2 dropping the delay-request message or the secondary device 102-2 responding to the delay-request message with a delay-response message raises Issue 5.

In further examples, if there are multiple access-side MCLAGs between the access device 116 and the MCLAG logical device 102, different client devices 112 may be connected by different access-side MCLAGs to the MCLAG logical device 102. This may result in delay-request packets from different ordinary time clocks 114 being sent on different access-side MCLAGs, and as a result, some delay-request packets may not reach a target device of the MCLAG logical device 102. This can cause a time synchronization process to fail, which raises Issue 5.

Issues 2, 4, and 5 discussed above are caused by the application of the LAG hash algorithm that may cause unpredictability in which of the primary and secondary devices 102-1 and 102-2 of the MCLAG logical device 102 receive certain timing messages. In other words, due to the LAG hash algorithm, a timing message may not arrive at the intended target, which can be either the primary or secondary device of the MCLAG logical device 102. Improper handling of timing messages (such as by dropping timing messages) may cause errors in a time synchronization process and/or lead to inaccurate time offset computations.

The presence of multiple access-side MCLAGs can lead to unpredictability and errors in time synchronization processes. Moreover, sending redundant messages, such as redundant announce, synchronization, or follow-up messages, to a clock sink may reduce time offset accuracy and increases unpredictability at the clock sink.

Example Implementations for Addressing Various Issues

The following describes various examples for addressing the issues discussed above. In some examples, a boundary time clock in the MCLAG logical device 102 includes a time protocol engine and an MCLAG timing control engine.

As used here, an "engine" can refer to one or more hardware processing circuits, which can include any or some combination of a microprocessor, a core of a multi-core microprocessor, a microcontroller, a programmable integrated circuit, a programmable gate array, or another hardware processing circuit. Alternatively, an "engine" can refer to a combination of one or more hardware processing circuits and machine-readable instructions (software and/or firmware) executable on the one or more hardware processing circuits. In the example of FIG. 1, an engine in a respective boundary time clock is implemented with a portion of the hardware processing circuitry of the respective boundary time clock, or with machine-readable instructions executable by the respective boundary time clock.

The primary BTC 104-1 includes a time protocol engine 130-1, and the secondary BTC 104-2 includes a time protocol engine 130-2. A time protocol engine in a time clock behaving as a boundary time clock consumes timing messages (according to the time synchronization protocol) for the purpose of supporting the computation of time offsets between a clock source and a clock sink (note that the boundary time clock can act as a clock source with respect to downstream time clocks and act as a clock sink with respect to upstream time clocks).

The primary BTC 104-1 further includes an MCLAG timing control engine 132-1, and the secondary BTC 104-2 further includes an MCLAG timing control engine 132-2. An MCLAG timing control engine changes the behavior of the time protocol engine in a respective boundary time clock to handle specific timing messages in a way that deviates from the expected handling of the specific timing messages according to the time synchronization protocol. Such changes in the handling of the specific timing messages address Issues 1 to 5 discussed above.

As further shown in FIG. 1, the primary device 102-1 includes a memory 140-1, and the secondary device 102-2 includes a memory 140-2. A memory can be implemented with one or more memory devices, such as dynamic random access memory (DRAM) devices, static random access memory (SRAM) devices, flash memory devices, or other types of memory devices. The memories 140-1 and 140-2 store various information (discussed further below) that are to be used by the respective MCLAG timing control engine 132-1 and 132-2.

Implementations for Addressing Issues 1 and 3

To address Issues 1 and 3, the primary and secondary BTCs 104-1 and 104-2 of the MCLAG logical device 102 perform an exchange of announce messages over the inter-device link 122. The MCLAG timing control engines 132-1 and 132-2 determine which of the primary and secondary BTCs 104-1 and 104-2 should act as a clock source and which should act as a clock sink.

The designation of one of the BTCs 104-1 and 104-2 as the clock source and the other of the boundary time clocks 104-1 and 104-2 as the clock sink over the inter-device link 122 is for the purpose of controlling the behavior of the primary and secondary BTCs 104-1 and 104-2 with respect to transmitting certain timing messages, such as announce, synchronization, and/or follow-up messages.

Figure 3:
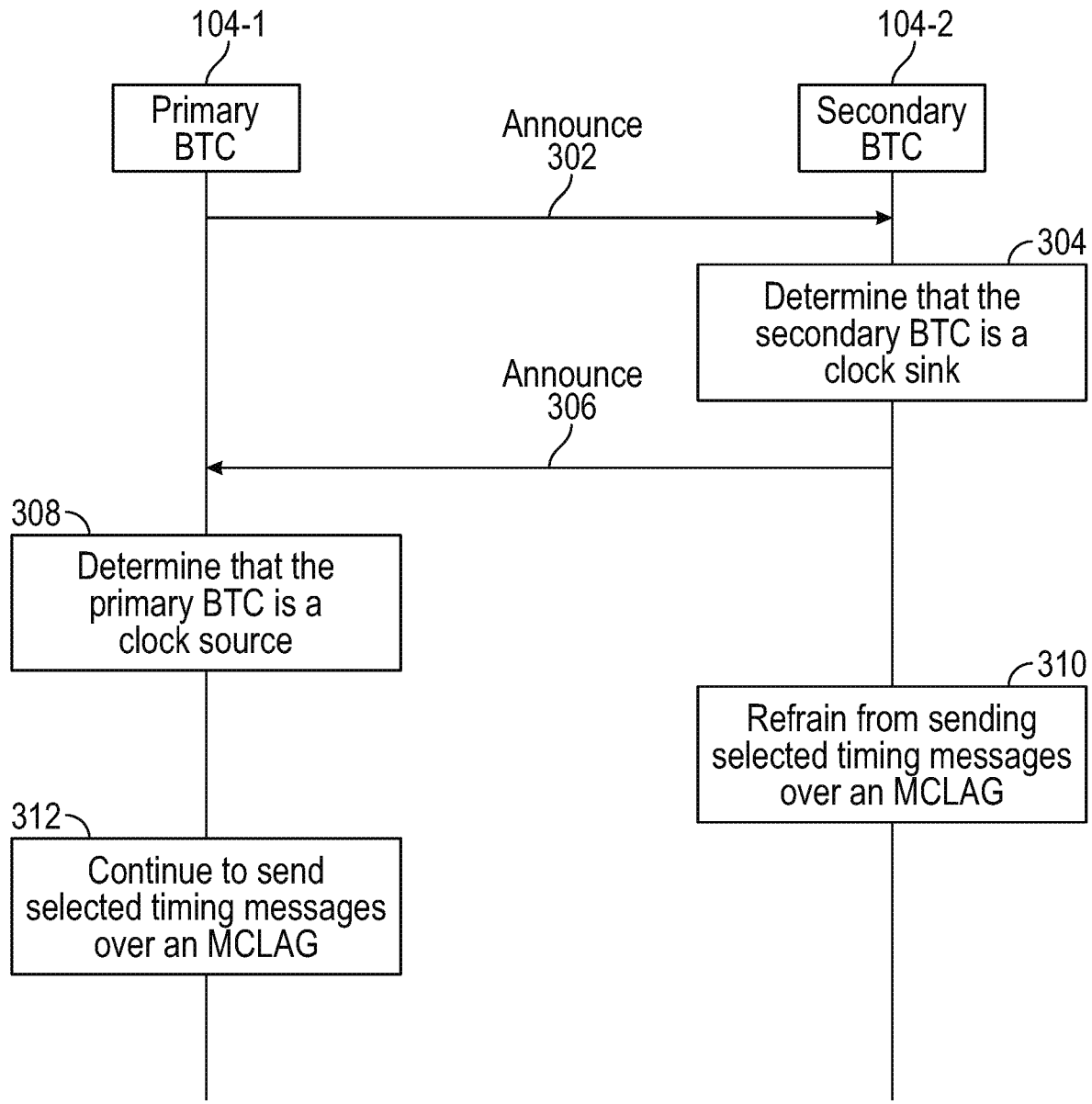
FIG. 3 is a flow diagram of a process relating to identifying a clock source and a clock sink between boundary time clocks of an MCLAG logical device and handling of timing messages by the clock source and the clock sink, according to some examples.

FIG. 3 is a flow diagram of a process performed by the primary BTC 104-1 in the primary device 102-1 and the secondary BTC 104-2 in the secondary device 102-2. Although FIG. 3 shows a specific sequence of tasks, in other examples, the tasks can be performed in a different order, some tasks may be omitted, and/or other tasks may be added.

The primary BTC 104-1 sends (at 302) an announce message to the secondary BTC 104-2 over the inter-device link 122 of the MCLAG logical device 102. Based on the announce message from the primary BTC 104-1, the MCLAG timing control engine 132-2 in the secondary BTC 104-2 makes a determination of whether the secondary BTC 104-2 is a clock source or a clock sink. In the example, it is assumed that the MCLAG timing control engine 132-2 determines (at 304) that the secondary BTC 104-2 is a clock sink over the inter-device link 122 of the MCLAG logical device 102.

The secondary BTC 104-2 sends (at 306) an announce message to the primary BTC 104-1. Based on the announce message from the secondary BTC 104-2, the MCLAG timing control engine 132-1 in the primary BTC 104-1 makes a determination of whether the primary BTC 104-1 is a clock source or clock sink. In the example of FIG. 3, it is assumed that the MCLAG timing control engine 132-1 determines (at 308) that the primary BTC 104-1 is the clock source over the inter-device link 122 of the MCLAG logical device 102.

In some examples, the selection of the clock source and a clock sink between the boundary time clocks 104-1 and 104-2 is according to the best clock source algorithm, such as PTP's BMCA, based on quality information included in the announce messages.

After the MCLAG timing control engine 132-2 has designated the secondary BTC 104-2 as the clock sink, the time protocol engine 130-2 in the in the secondary BTC 104-2 refrains (at 310) from sending selected timing messages over an MCLAG, such as the access-side MCLAG 120. The selected timing messages that are not sent by the clock sink include announce messages, synchronization messages, and follow-up messages.

Since the MCLAG timing control engine 132-1 has designated the primary BTC 104-1 as the clock source, the time protocol engine 130-1 in the primary BTC 104-1 continues (at 312) to send the selected timing messages (including announce messages, synchronization messages, and follow-up messages) over an MCLAG, such as the access-side MCLAG 120.

Since just one of the boundary time clocks 104-1 and 104-2 in the MCLAG logical device 102 would send the selected timing messages over the access-side MCLAG 120, external clock sinks such as the ordinary time clocks 114 in the client devices 112 (FIG. 1) would not receive redundant announce messages, synchronization messages, or follow-up messages from multiple different boundary time clocks in the MCLAG logical device 102, which addresses Issues 1 and 3. Note that a time clock (whether a clock source or a clock sink) is "external" if the time clock is outside the MCLAG logical device 102.

Using the ability of the MCLAG timing control engines 132-1 and 132-2 to select one of the boundary time clocks 104-1 and 104-2 of the MCLAG logical device 102 as the clock source and the other one of the boundary time clocks 104-1 and 104-2 as the clock sink over the inter-device link 122, the behavior of the boundary time clocks 104-1 and 104-2 can be modified from the expected behavior according to the time synchronization protocol. Whereas a boundary time clock would be expected to send the selected timing messages to downstream time clocks according to the time synchronization protocol, the boundary time clock if identified as the clock sink over the inter-device link 122 would refrain from sending the selected timing to downstream time clocks.

Implementations for Addressing Issue 2

To address Issue 2, the MCLAG timing control engine in a boundary time clock of the MCLAG logical device 102 is able to change a clock role of the boundary time clock (that received a synchronization message or a follow-up message intended for the peer boundary time clock) to a hybrid transparent time clock role. Unless the clock role of the boundary time clock is changed, the time protocol engine in the boundary time clock consumes timing messages according to the time synchronization protocol to support the computation of time offsets for synchronizing time clocks. However, if the clock role of the boundary time clock is changed to the hybrid transparent time clock role, then the boundary time clock behaves as a transparent time clock and the time protocol engine processes timing messages in the role of the transparent time clock.

Alternatively, to address Issue 2, the MCLAG timing control engine in the boundary time clock of the MCLAG logical device 102 is able to change a clock role of the boundary time clock (that received a synchronization message intended for the peer boundary time clock) from a clock sink role to a clock source role.

As shown in FIG. 1, the memory 140-1 in the primary device 102-1 of the MCLAG logical device 102 stores a foreign clock source table 142-1, and the memory 140-2 in the secondary device 102-2 stores a foreign clock source table 142-2. A foreign clock source table includes one or more entries corresponding to one or more different foreign clock sources identified by a respective boundary time clock. More specifically, an entry of the foreign clock source table 142-1 includes information of a foreign clock source identified by the primary BTC 104-1, and an entry of the foreign clock source table 142-2 includes information of a foreign clock source identified by the secondary BTC 104-2. A "foreign" clock source refers to a clock source external of the boundary time clock, and which was identified based on an exchange of announce messages according to the time synchronization protocol.

In other examples, information of a foreign clock source table can be contained in a different type of data structure (i.e., different from a table). The data structure may be in the form of a file, a region of a memory, a register, or any other type of data structure.

Examples of information in an entry of a foreign clock source table include any or some combination of the following: a source interface identifier of a LAG interface (port) of an electronic device including the foreign clock source associated with the entry (e.g., a sourcePortIdentity according to the PTP); an identifier of the foreign clock source (e.g., clockIdentity according to the PTP); a priority of the foreign clock source; a class of the foreign clock source, an accuracy of the foreign clock source, or other information. In some examples, the information added to an entry of the foreign clock source table can be extracted from an announce message received from the foreign clock source.

In the ensuing discussion, it is assumed that the grand clock source 108 has exchanged announce messages with the primary BTC 104-1 of the primary device 102-1, and a clock source and a clock sink have been selected according to the best clock source algorithm. After application of the best clock source algorithm, the grand clock source 108 sends a synchronization message that is intended for the primary BTC 104-1 of the MCLAG logical device 102. However, due to application of the LAG hash algorithm at the core device 105, a LAG interface connected through the core-side MCLAG 118 to the secondary device 102-2 is selected, such that the synchronization message intended for the primary BTC 104-1 arrives at the secondary BTC 104-2 instead.

Figure 4:
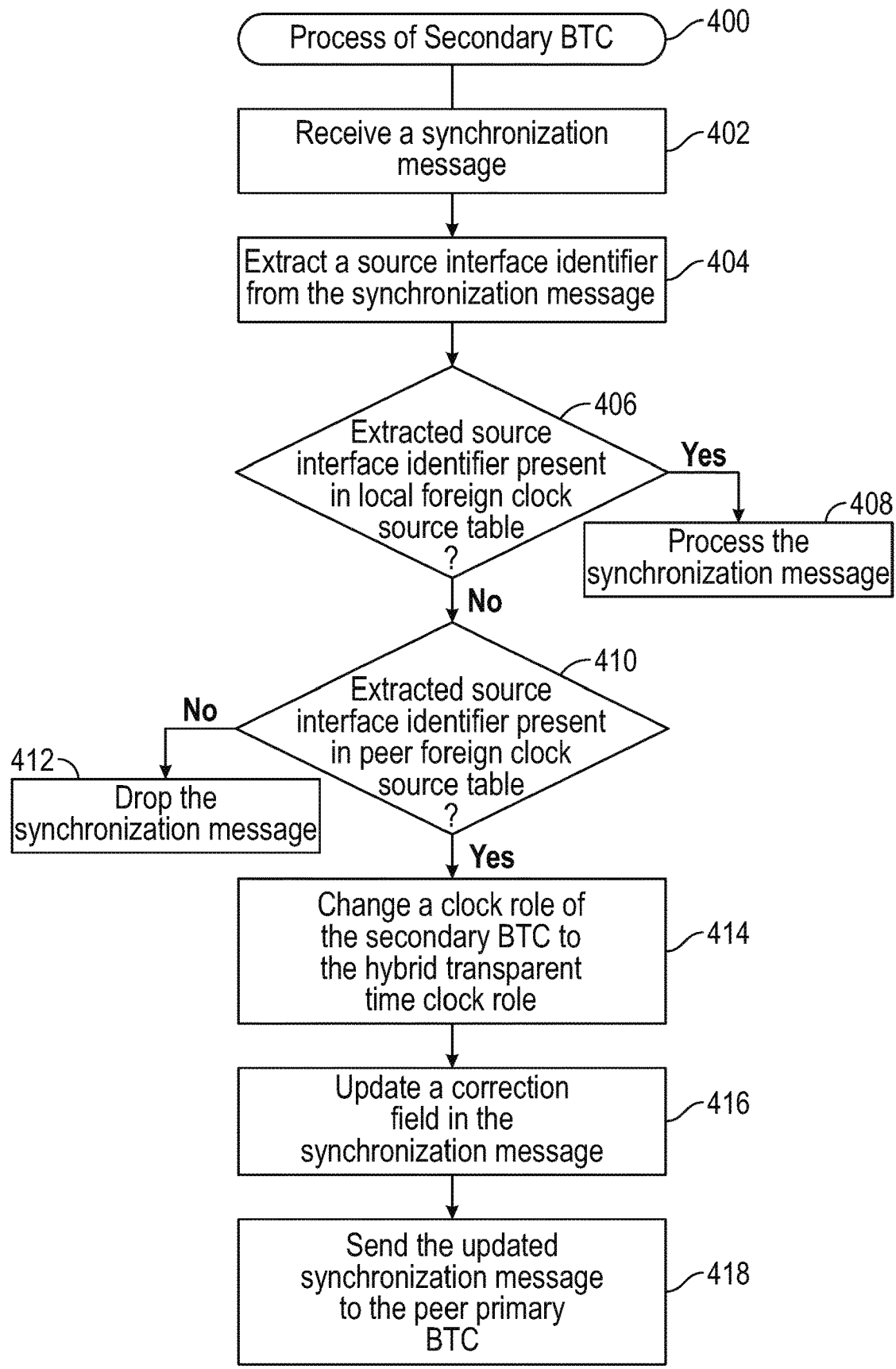
FIGS. 4 and 6 are flow diagrams of processes of a secondary boundary time clock, according to some examples.

FIG. 4 is a flow diagram of a process 400 performed by the secondary BTC 104-2 for addressing Issue 2 using the first technique. Although FIG. 4 shows a specific sequence of tasks, in other examples, the tasks can be performed in a different order, some tasks may be omitted, and/or other tasks may be added.

Referring to FIG. 4, the secondary BTC 104-2 of the secondary device 102-2 receives (at 402) the synchronization message sent by the upstream clock source (e.g., the grand clock source 108). The secondary BTC 104-2 checks whether the synchronization message is targeted to itself or to the peer primary BTC 104-1. This check is performed as follows.

The MCLAG timing control engine 132-2 of the secondary BTC 104-2 extracts (at 404) the source interface identifier (e.g., the sourcePortIdentity of the PTP) from a header of the synchronization message and checks (at 406) if the extracted source interface identifier is present in any entry of the foreign clock source table 142-2. According to the PTP, a portIdentity contains two attributes: clockIdentity (to identify a time clock) and PortNumber (to identify a port). The portIdentity is copied into a PTP message header's sourcePortIdentity field of a timing message when the time clock transmits the timing message.

The checking at 406 is performed by comparing the extracted source interface identifier with source interface identifier(s) in the one or more entries of the of the (local) foreign clock source table 142-2. The foreign clock source table 142-2 is "local" with respect to the secondary BTC 104-2 that received the synchronization message. A match of the extracted source interface identifier with a source interface identifier in an entry of the (local) foreign clock source table 142-2 indicates that the extracted source interface identifier is present in the foreign clock source table 142-2.

The extracted source interface identifier being in an entry of the (local) foreign clock source table 142-2 indicates the secondary BTC 104-2 previously received an announce message (from the upstream clock source) for the source interface identifier. If the MCLAG timing control engine 132-2 determines that the extracted source interface identifier is present in an entry of the (local) foreign clock source table 142-2, no modification is made to the behavior of the secondary BTC 104-2 (with respect to how the secondary BTC 104-2 is to behave according to the time synchronization protocol), and the time protocol engine 130-2 in the secondary BTC 104-2 processes (at 408) the synchronization message according to the time synchronization protocol.

However, if the MCLAG timing control engine 132-2 determines that the extracted source interface identifier is not present in any entry of the (local) foreign clock source table 142-2, the MCLAG timing control engine 132-2 checks (at 410) to determine whether the extracted source interface identifier is present in any entry of the (peer) foreign clock source table 142-1 of the peer primary BTC 104-1. The foreign clock source table 142-1 is a "peer" foreign clock source table since it is associated with the primary BTC 104-1 (from the perspective of the secondary BTC 104-2).

In some examples, a copy (e.g., a cached copy) of the foreign clock source table 142-1 may be stored in the memory 140-2 of the secondary device 102-2. The checking at 410 can be performed with respect to the copy of the (peer) foreign clock source table 142-1. In other examples, the checking at 410 can be performed by accessing, over the inter-device link 122, the (peer) foreign clock source table 142-1 in the memory 140-1 of the primary device 102-1.

In examples where copies of foreign clock source tables are maintained at the primary and secondary devices 102-1 and 102-2, the MCLAG timing control engine 132-1 and 132-2 can synchronize the copies of the foreign clock source tables to maintain consistency with the original foreign clock source tables.

If the MCLAG timing control engine 132-2 determines (at 410) that the extracted source interface identifier is not present in any entry of the (peer) foreign clock source table 142-1, the MCLAG timing control engine 132-2 causes the time protocol engine 130-2 of the secondary BTC 104-2 to drop (at 412) the synchronization message, which results in a failure of the time synchronization process between the upstream clock source (e.g., the grand clock source 108) and a boundary time clock in the MCLAG logical device 102. In some examples, the MCLAG timing control engine 132-2 can send, to the time protocol engine 130-2, an indication that the source interface identifier is not present in any entry of the (peer) foreign clock source table 142-1. This indication can cause the timing control engine 132-2 to drop the synchronization message. An "indication" can refer to a signal, an information element, or any other type of indicator.

If the MCLAG timing control engine 132-2 determines (at 410) that the extracted source interface identifier is present in an entry of the (peer) foreign clock source table 142-1 of the peer primary BTC 104-1, the MCLAG timing control engine 132-2 changes (at 414) a clock role of the secondary BTC 104-2 to the hybrid transparent time clock role for processing the synchronization message. In some examples, the MCLAG timing control engine 132-2 can send a hybrid transparent time clock role indication to the time protocol engine 130-2 to change the role of the time protocol engine 130-2. This hybrid transparent time clock role indication causes the time protocol engine 130-2 to process the synchronization message in a way that a transparent time clock would process the synchronization message.

In response to the hybrid transparent time clock role indication, the time protocol engine 130-2 updates (at 416) a correction field in the synchronization message with a resident time of the synchronization message in the secondary BTC 104-2. The resident time is the difference between the egress time of the updated synchronization message (with the correction field updated) (as transmitted from the secondary BTC 104-2 to the peer primary BTC 104-1 over the inter-device link 122) and the ingress time of the synchronization message (as received at the secondary BTC 104-2).

The secondary BTC 104-2 sends (at 418) the updated synchronization message (with the updated correction field) to the peer primary BTC 104-1 over the inter-device link 122.

Figure 5:
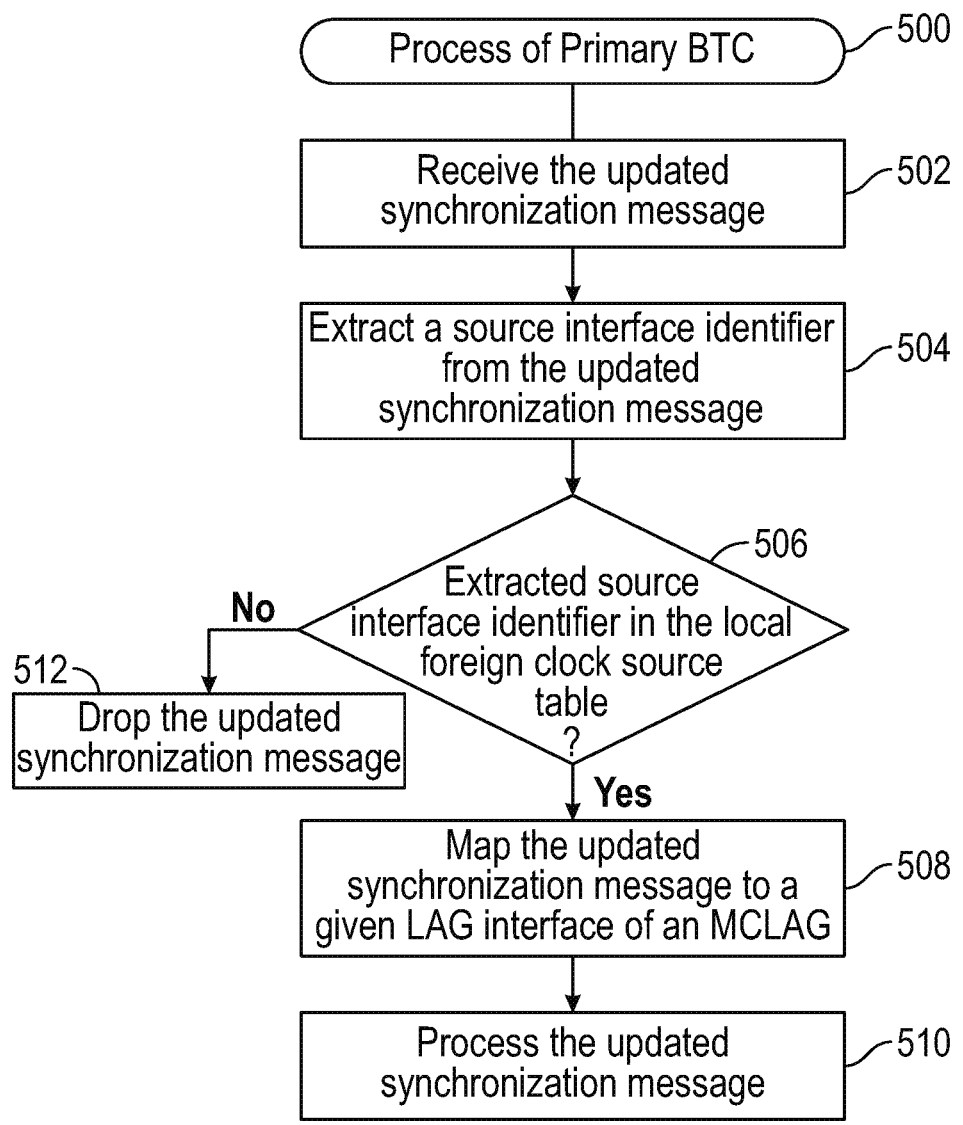
FIGS. 5 and 7 are flow diagrams of processes of a primary boundary time clock, according to some examples.

FIG. 5 is a flow diagram of an example process 500 performed by the primary BTC 104-1 of the primary device 102-1 for addressing Issue 2. Although FIG. 5 shows a specific sequence of tasks, in other examples, the tasks can be performed in a different order, some tasks may be omitted, and/or other tasks may be added.

The primary BTC 104-1 receives (at 502) the updated synchronization message (with the updated correction field) from the peer secondary BTC 104-2. According to the time synchronization protocol, the primary BTC 104-1 does not expect to receive any synchronization message over the inter-device link 122. However, in accordance with some examples of the present disclosure, the MCLAG timing control engine 132-1 of the primary BTC 104-1 modifies the behavior of the primary BTC 104-1 with respect to the updated synchronization message from the peer secondary BTC 104-2 so that the primary BTC 104-1 can properly process the updated synchronization message.

The MCLAG timing control engine 132-1 of the primary BTC 104-1 extracts (at 504) the source interface identifier from the updated synchronization message received from the peer secondary BTC 104-2. The MCLAG timing control engine 132-1 checks (at 506) if the extracted source interface identifier is present in any entry of the (local) foreign clock source table 142-1. If the extracted source interface identifier is in an entry of the foreign clock source table 142-1, that indicates the primary BTC 104-1 previously received an announce message (from the upstream clock source) for the source interface identifier.

In response to determining (at 506) that the extracted source interface identifier is present in an entry of the foreign clock source table 142-1, the MCLAG timing control engine 132-1 maps (at 508) the updated synchronization message to a given LAG interface (of an MCLAG) at which the boundary time clock 102-1 received the announce message from the upstream clock source (e.g., the grand clock source 108), and causes the time protocol engine 130-1 to process (at 510) the updated synchronization message according to the time synchronization protocol. For example, the MCLAG timing control engine 132-1 can send an indication to the time protocol engine 130-1 that the updated synchronization message is associated with the given LAG interface. Mapping the updated synchronization message to the given LAG interface refers to associating the updated synchronization message to the given LAG interface so that any further timing message transmission by the time protocol engine 130-1 is from the given LAG interface.

In response to determining (at 506) that the extracted source interface identifier is not present in any entry of the foreign clock source table 142-1, the MCLAG timing control engine 132-1 causes the time protocol engine 130-1 of the primary BTC 104-1 to drop (at 512) the updated synchronization message, which results in a failure of the time synchronization process between the upstream clock source (e.g., the grand clock source 108) and a boundary time clock in the MCLAG logical device 102.

If the upstream clock source (e.g., the grand clock source 108) is a two-step clock, then the upstream clock source would send a follow-up message after the synchronization message. The processing of the follow-up message if received by the secondary BTC 104-2 of the secondary device 102-2 is similar to the processing performed according to FIG. 4. One difference would be that the processing of the follow-up message would not involve an update of a correction field in the follow-up message (e.g., task 416 in FIG. 4 would be omitted with respect to the follow-up message). As a result, the follow-up message sent from the secondary BTC 104-2 to the peer primary BTC 104-1 would be unmodified with respect to the follow-up message received at the secondary BTC 104-2.

The processing of the follow-up message received by the primary BTC 104-1 from the peer secondary BTC 104-2 includes tasks similar to those depicted in FIG. 5.

Alternatively, to address Issue 2, the MCLAG timing control engine 132-2 in the secondary BTC 104-2 is able to change its clock role from a clock sink role to a clock source role over the inter-device link 122. In response to receiving the synchronization message from the upstream clock source (e.g., the grand clock source 108), the MCLAG timing control engine 132-2 of the secondary BTC 104-2 performs tasks similar to tasks 404, 406, and 410 discussed above. If the MCLAG timing control engine 132-2 determines (similar to task 410) that the extracted source interface identifier (from the synchronization message) is present in an entry of the (peer) foreign clock source table 142-1 of the peer primary BTC 104-1, the secondary BTC 104-2 sends, to the primary BTC 104-1, an indication of receipt of the synchronization message. The indication can be in the form of a message or an information element, and contains information (e.g., the source interface identifier) of the synchronization message. In response to the indication, the primary BTC 104-1 determines from its local foreign clock source table 142-1 that the source interface identifier of the synchronization message is in an entry of the foreign clock source table 142-1. In response, the primary BTC 104-1 forwards the announce message (without modification) previously received from the upstream clock source to the secondary BTC 104-2. The primary BTC 104-1 also changes its clock role from the clock source role to the clock sink role over the inter-device link 122. The secondary BTC 104-2 compares the source interface identifier (e.g., PTP source-PortIdentity) of the forwarded announce message to a stored source interface identifier of the synchronization message received previously. The forwarded announce message is mapped to the corresponding LAG interface (of an MCLAG) at which the synchronization message was received. The MCLAG timing control engine 132-2 in the secondary BTC 104-2 changes its clock role from the clock sink role to the clock source role over the inter-device link 122. At this point, the secondary BTC 104-2 is able to consume the synchronization message. With this alternative approach, the secondary BTC 104-2 does not transition to the hybrid transparent time clock role.

Implementations for Addressing Issue 4

To address Issue 4, the MCLAG timing control engine in a boundary time clock of the MCLAG logical device 102 is able to change a clock role of the boundary time clock to the hybrid transparent time clock role (similar to the process discussed above for addressing Issue 2) for the purpose of processing a delay-response message from an external clock source, such as the grand clock source 108.

In the ensuing discussion, it is assumed that the primary BTC 104-1 of the primary device 102-1 of the MCLAG logical device 102 has sent a delay-request message to the upstream clock source (e.g., the grand clock source 108). In response to the delay-request message from the primary BTC 104-1, the upstream clock source generates a delay-response message that is intended for the primary BTC 104-1. However, due to application of the LAG hash algorithm at the core device 105, a LAG interface connected through the core-side MCLAG 118 to the secondary device 102-2 is selected, such that the delay-response message intended for the primary BTC 104-1 arrives at the secondary BTC 104-2 instead.

Figure 6:
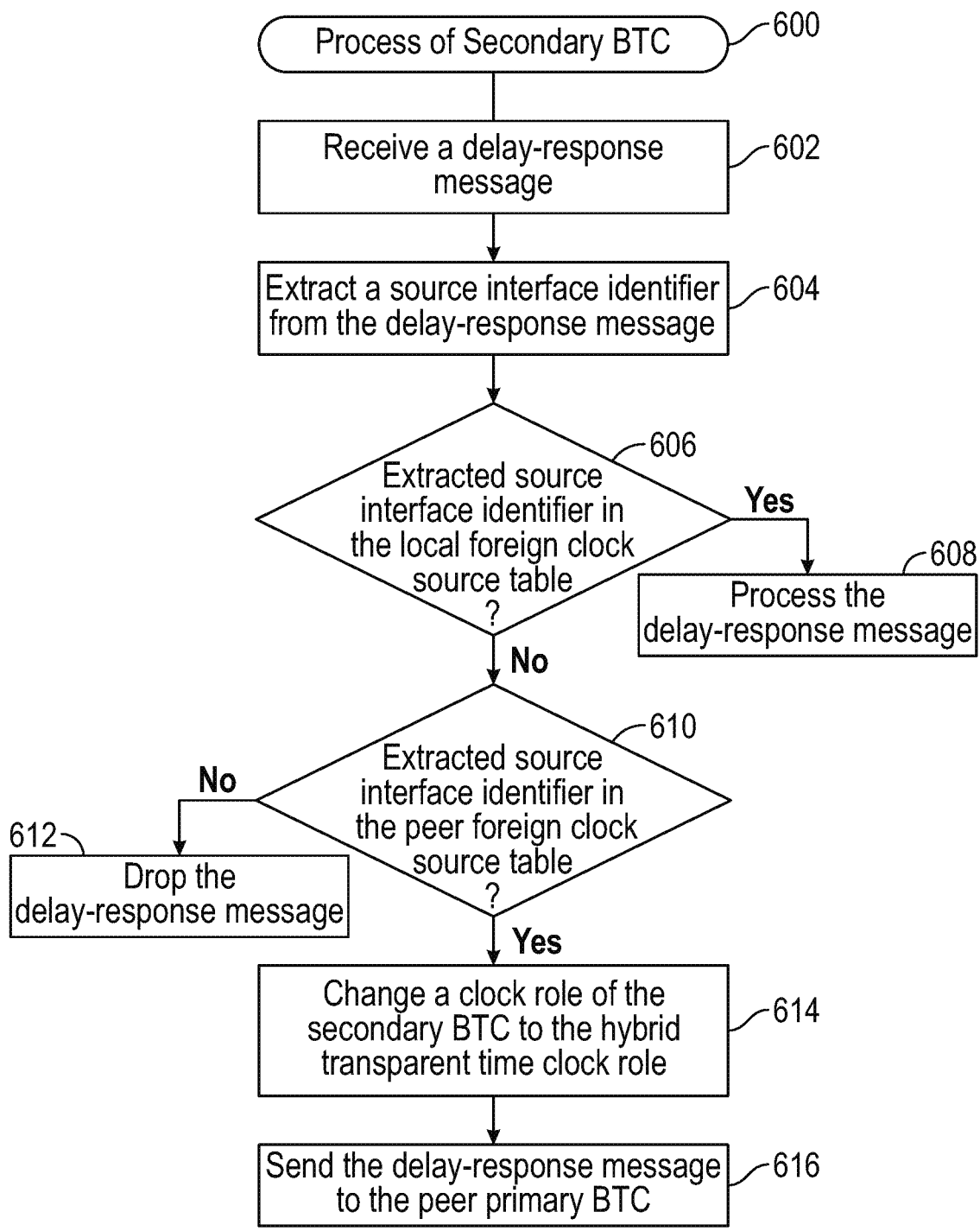

FIG. 6 is a flow diagram of an example process 600 performed by the secondary BTC 104-2 for addressing Issue 4. Although FIG. 6 shows a specific sequence of tasks, in other examples, the tasks can be performed in a different order, some tasks may be omitted, and/or other tasks may be added.

Referring to FIG. 6, the secondary BTC 104-2 of the secondary device 102-2 receives (at 602) the delay-response message sent by the upstream clock source (e.g., the grand clock source 108). The secondary BTC 104-2 checks whether the delay-response message is targeted to itself or to the peer primary BTC 104-1. This check is performed as follows.

The MCLAG timing control engine 132-2 of the secondary BTC 104-2 extracts (at 604) the source interface identifier (e.g., the sourcePortIdentity of the PTP) from a header of the delay-response message and checks (at 606) if the extracted source interface identifier is present in any entry of the (local) foreign clock source table 142-2.

If the extracted source interface identifier is in an entry of the (local) foreign clock source table 142-2, that indicates the secondary BTC 104-2 has engaged in a time synchronization process (including an exchange of announce messages, a receipt of a synchronization message, and the transmission of the delay-request message) with the upstream clock source (e.g., the grand clock source 108) for the source interface identifier. If the MCLAG timing control engine 132-2 determines that the extracted source interface identifier is present in an entry of the (local) foreign clock source table 142-2, no modification is made to the behavior of the secondary BTC 104-2 (with respect to how the secondary BTC 104-2 is to behave according to the time synchronization protocol), and the time protocol engine 130-2 in the secondary BTC 104-2 processes (at 608) the delay-response message according to the time synchronization protocol.

However, if the MCLAG timing control engine 132-2 determines that the extracted source interface identifier is not present in any entry of the foreign clock source table 142-2, the MCLAG timing control engine 132-2 checks (at 610) to determine whether the extracted source interface identifier is present in any entry of the (peer) foreign clock source table 142-1 of the peer primary BTC 104-1. If the MCLAG timing control engine 132-2 determines (at 610) that the extracted source interface identifier is not present in any entry of the (peer) foreign clock source table 142-1, the MCLAG timing control engine 132-2 causes the time protocol engine 130-2 of the secondary BTC 104-2 to drop (at 612) the delay-response message, which results in a failure of the time synchronization process between the upstream clock source (e.g., the grand clock source 108) and a boundary time clock in the MCLAG logical device 102.

If the MCLAG timing control engine 132-2 determines (at 610) that the extracted source interface identifier is present in an entry of the (peer) foreign clock source table 142-1 of the peer primary BTC 104-1, the MCLAG timing control engine 132-2 changes (at 614) a clock role of the secondary BTC 104-2 to the hybrid transparent time clock role for processing the delay-response message. In some examples, the MCLAG timing control engine 132-2 can send a hybrid transparent time clock role indication to the time protocol engine 130-2 to change the clock role of the time protocol engine 130-2.

In response to the hybrid transparent time clock role indication, the time protocol engine 130-2 sends (at 616) the delay-response message to the peer primary BTC 104-1 over the inter-device link 122. Note that the delay-response message sent over the inter-device link is unmodified (e.g., a correction field of the delay-response message is not updated).

Figure 7:
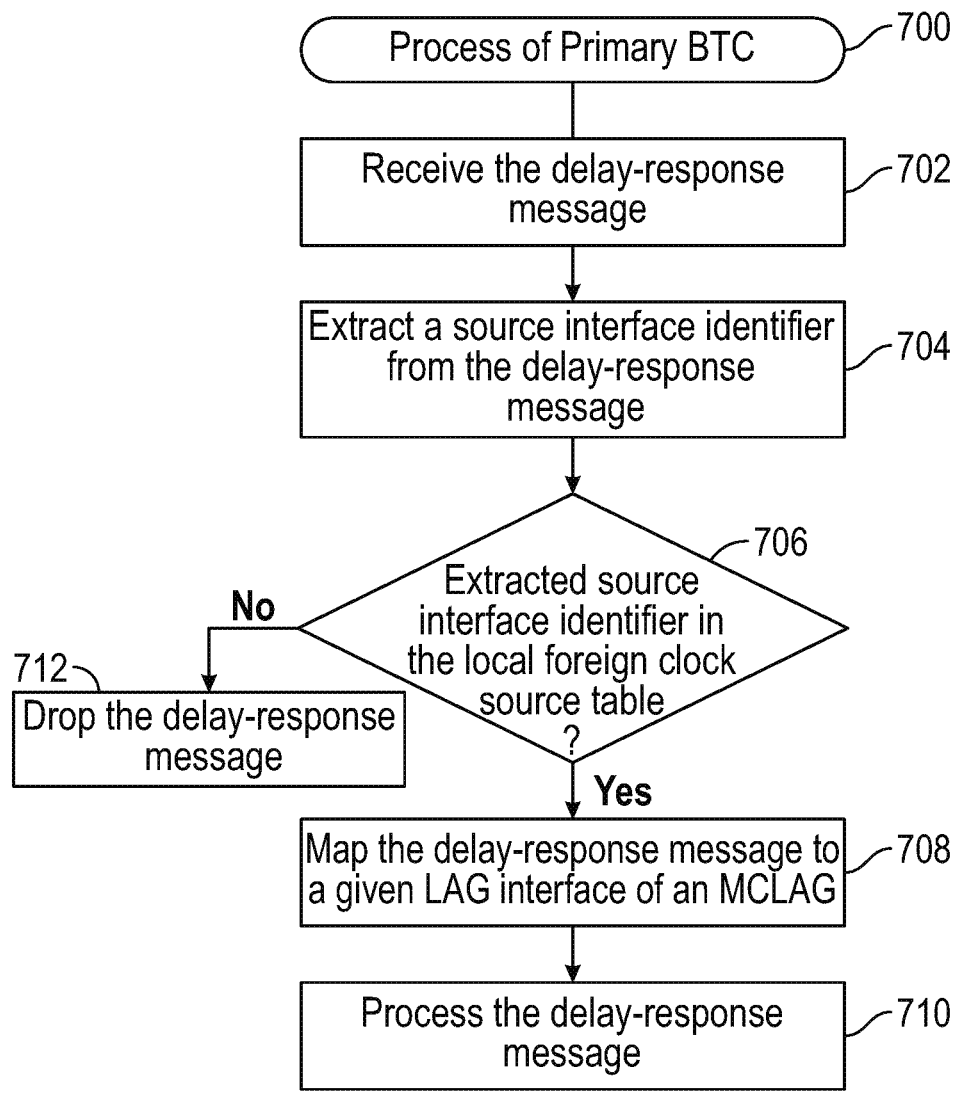

FIG. 7 is a flow diagram of an example process 700 performed by the primary BTC 104-1 of the primary device 102-1 for addressing Issue 4. Although FIG. 7 shows a specific sequence of tasks, in other examples, the tasks can be performed in a different order, some tasks may be omitted, and/or other tasks may be added.

The primary BTC 104-1 receives (at 702) the delay-response message from the peer secondary BTC 104-2. The MCLAG timing control engine 132-1 of the primary BTC 104-1 extracts (at 704) the source interface identifier from the delay-response message received from the peer secondary BTC 104-2. The MCLAG timing control engine 132-1 checks (at 706) if the extracted source interface identifier is present in any entry of the (local) foreign clock source table 142-1. The extracted source interface identifier being in an entry of the foreign clock source table 142-1 indicates the primary BTC 104-1 has engaged in a time synchronization process (with the upstream clock source (e.g., the grand clock source 108) for the source interface identifier.

In response to determining (at 706) that the extracted source interface identifier is present in an entry of the (local) foreign clock source table 142-1, the MCLAG timing control engine 132-1 maps (at 708) the delay-response message to a given LAG interface (of an MCLAG) at which the boundary time clock 102-1 has exchanged timing messages with the upstream clock source (e.g., the grand clock source 108), and causes the time protocol engine 130-1 to process (at 710) the delay-response message according to the time synchronization protocol.

In response to determining (at 706) that the extracted source interface identifier is not present in any entry of the (local) foreign clock source table 142-1, the MCLAG timing control engine 132-1 causes the time protocol engine 130-1 of the primary BTC 104-1 to drop (at 712) the delay-response message, which results in a failure of the time synchronization process between the upstream clock source (e.g., the grand clock source 108) and a boundary time clock in the MCLAG logical device 102.

Implementations for Addressing Issue 5

To address Issue 5, the MCLAG timing control engine in a boundary time clock of the MCLAG logical device 102 is able to change a clock role of the boundary time clock to the clock-hybrid transparent time clock role for the purpose of processing a delay-request message from a clock sink, such as a client device 112.

Figure 8:
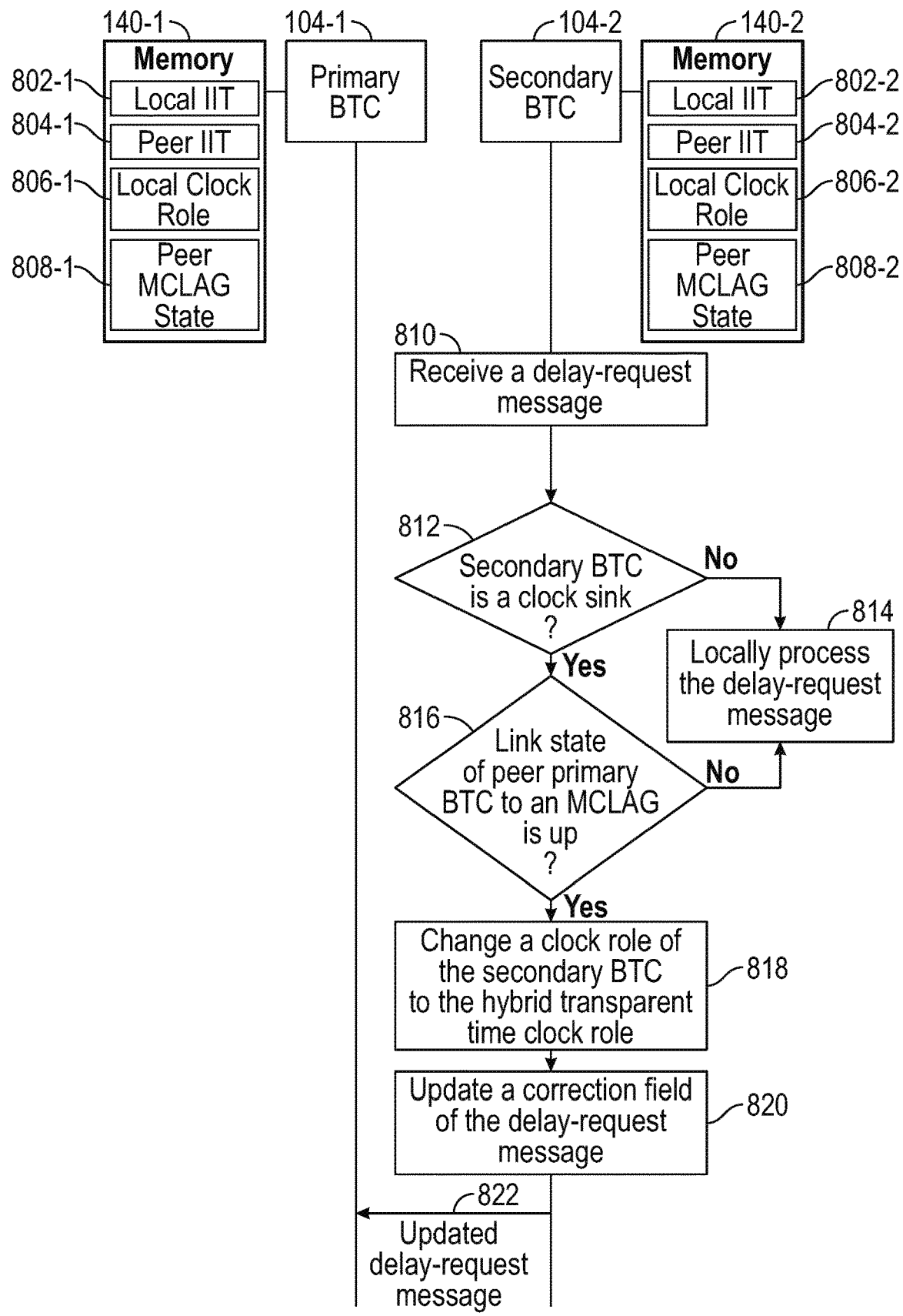
FIG. 8 is a flow diagram of a process of primary and secondary boundary time clocks, according to further examples.

FIG. 8 is a flow diagram of an example process performed by the primary and secondary BTCs 104-1 and 104-2 for addressing Issue 5. Although FIG. 8 shows a specific sequence of tasks, in other examples, the tasks can be performed in a different order, some tasks may be omitted, and/or other tasks may be added.

FIG. 8 further shows additional information stored in the memory 140-1 accessible by the primary BTC 104-1 and the memory 140-2 accessible by the primary BTC 104-2. The additional information stored in the memory 140-1 includes a local interface identity table (IIT) 802-1, a peer IIT 804-1, local clock role indicator 806-1, and peer MCLAG state indicator 808-1. Similarly, the additional information stored in the memory 140-2 includes a local IIT 802-2, a peer IIT 804-2, local clock role indicator 806-2, and peer MCLAG state indicator 808-2.

The local clock role indicator 806-1 or 606-2 indicates whether the respective BTC (104-1 or 104-2) is a clock source or a clock sink. An "indicator" can refer to a flag (e.g., a bit or a collection of bits) or any other type of information element that can be set to different values (e.g., a first value to specify that the respective BTC of the MCLAG logical device 102 is a clock source and a different second value to specify that the respective BTC of the MCLAG logical device 102 is a clock sink).

The peer MCLAG state indicator 808-1 or 608-2 indicates whether a link state (or forwarding state) of a peer BTC to an MCLAG is up (operational) or down (non-operational). For example, the peer MCLAG state indicator 808-1 (accessible by the primary BTC 104-1) being set to a first value indicates that the link state of the peer secondary BTC 104-2 to an MCLAG is up (i.e., the peer secondary BTC 104-2 has an operational link state to an MCLAG). However, the peer MCLAG state indicator 808-1 being set to a different second value indicates that the link state of the peer secondary BTC 104-2 to an MCLAG is down (i.e., the peer secondary BTC 104-2 has a non-operational link state to an MCLAG). The peer MCLAG state indicator 808-2 (accessible by the secondary BTC 104-2) being set to a first value indicates that the link state of the peer primary BTC 104-1 to an MCLAG is up, and the peer MCLAG state indicator 808-2 being set to a different second value indicates that the link state of the peer primary BTC 104-1 to an MCLAG is down.

The local IIT 802-1 is a table maintained by the MCLAG timing control engine 132-1 of the primary BTC 104-1. An entry of the local IIT 802-1 maps an interface identifier (e.g., portIdentity of the PTP) that identifies a LAG interface (at which a delay-request message was transmitted from a clock sink) to an MCLAG to which the LAG interface is connected. The interface identifier can be based on an identity of a clock sink (that sent the delay-request message) and an identity of the LAG interface from which the clock sink sent the delay-request message. The entry of the local IIT 802-1 that maps the interface identifier to an MCLAG effectively maps a clock sink to the MCLAG. As additional delay-request messages are received by the primary BTC 104-1 over an MCLAG, the MCLAG timing control engine 132-1 adds respective additional entries to the local IIT 802-1. Note that it is possible that a BTC of the MCLAG logical device 102 is connected to multiple MCLAGs, so the entries of the local IIT 802-1 can map interface identifiers to respective MCLAGs.

The addition of entries to the local IIT 802-1 in response to receipt of delay-request messages is part of a delay-request clock sink learning process, in which the MCLAG timing control engine 132-1 tracks incoming delay-request messages and maps clock sinks that sent the delay-request messages to respective access-side MCLAG(s).

The local IIT 802-2 is a table maintained by the MCLAG timing control engine 132-2 of the secondary BTC 104-2. Entries are added to the local IIT 802-2 by the MCLAG timing control engine 132-2 as delay-request messages are received from clock sinks by the secondary BTC 104-2, as part of a delay-request clock sink learning process. The peer IIT 804-1 in the memory 140-1 accessible by the primary BTC 104-1 is a copy of the local IIT 802-2. Similarly, the peer IIT 804-2 in the memory 140-2 accessible by the secondary BTC 104-2 is a copy of the local IIT 802-1.

The MCLAG timing control engines 132-1 and 132-2 can synchronize the peer IIT 804-1 with the local IIT 802-2 (so that updates of the local IIT 802-2 are reflected in the peer IIT 804-1). Similarly, the MCLAG timing control engines 132-1 and 132-2 can synchronize the peer IIT 804-2 with the local IIT 802-1 (so that updates of the local IIT 802-1 are reflected in the peer IIT 804-2).

In other examples, instead of tables, the IITs 802-1, 804-1, 802-2, and 804-2 can be implemented with other types of data structures.

A delay-request message (such as according to the PTP) does not have a field to specifically identify a clock source that is the target of the delay-request message. As a result, a BTC receiving a delay-request message is unable to determine, based on a field in the delay-request message, whether the delay-request message is targeted to the BTC. To address the foregoing, a given BTC of the MCLAG logical device 102 receiving a delay-request message from a clock sink (e.g., an ordinary time clock 114 of a client device 112) is able to determine based on the additional information (discussed above) in the memory 140-1 or 140-2 whether the given BTC is the target of the delay-request message, and if not, the given BTC can forward the delay-request message to the peer BTC of the MCLAG logical device 102 for handling. The peer BTC receiving the forwarded delay-request message is able to map the forwarded delay-request message to a LAG interface of the peer BTC so that the peer BTC can send a delay-response message that is responsive to the forwarded delay-request message over the LAG interface to the clock sink.

FIG. 8 refers to an example in which a delay-request message intended for the primary BTC 104-1 of the MCLAG logical device 102 arrives at the secondary BTC 104-2 based on application of a LAG hash algorithm at an electronic device including the external clock sink that transmitted the delay-request message. For example, the electronic device including the external clock sink is a client device 112, which includes an ordinary time clock 114.

The secondary BTC 104-2 receives (at 810), from the external clock sink, the delay-request message at a LAG interface connected to the access-side MCLAG 120. The MCLAG timing control engine 132-2 of the secondary BTC 104-2 determines if the secondary BTC 104-2 should forward the delay-request message to the peer BTC 104-1. This determination is based on the local clock role indicator 806-2 and the peer MCLAG state indicator 808-2. The MCLAG timing control engine 132-2 determines if both the following conditions 1 and 2 are true. Condition 1 is true if the MCLAG timing control engine 132-2 determines from the local clock role indicator 806-2 that the secondary BTC 104-2 is a clock sink relative to the primary BTC 104-1. Condition 2 is true if the MCLAG timing control engine 132-2 determines from the peer MCLAG state indicator 808-2 that the peer primary BTC 104-1 that the link state of the peer primary BTC 104-1 to an MCLAG (e.g., the access-side MCLAG 120 or another access-side MCLAG if multiple access-side MCLAGs are present) is up.

If the MCLAG timing control engine 132-2 determines (at 812), from the local clock role indicator 806-2, whether the secondary BTC 104-2 is a clock sink. If not (condition 1 is false), the secondary BTC 104-2 is a clock source, the MCLAG timing control engine 132-2 locally processes (at 814) the delay-request message. For example, if the MCLAG timing control engine 132-2 determines from the local clock role indicator 806-2 that the secondary BTC 104-2 is a clock source relative to the primary BTC 104-1, then the MCLAG timing control engine 132-2 causes the time protocol engine 130-2 of the secondary BTC 104-2 to consume the delay-request message, which results in the time protocol engine 130-2 sending a delay-response message to the clock sink that sent the delay-request message (e.g., an ordinary time clock 114 of a client device 112).

On the other hand, if the MCLAG timing control engine 132-2 determines (at 812), from the local clock role indicator 806-2, that the secondary BTC 104-2 is a clock sink (condition 1 is true), the MCLAG timing control engine 132-2 determines (at 816), from the peer MCLAG state indicator 808-2, whether the link state of the peer primary BTC 104-1 to an MCLAG is up.

If not (condition 2 is false although condition 1 is true), that indicates that the peer primary BTC 104-1 does not have a link state to an MCLAG that is up, so the primary BTC 104-1 would not be capable of handling the delay-request message even if forwarded. In this case, the secondary BTC 104-2 locally processes (at 814) the delay-request message—in this case, the secondary BTC 104-2 can either respond to the delay-request message even though the delay-request message is intended for the primary BTC 104-1, or alternatively, the secondary BTC 104-2 can drop the delay-request message.

If the MCLAG timing control engine 132-2 determines (at 816), from the peer MCLAG state indicator 808-2, that the link state of the peer primary BTC 104-1 to an MCLAG is up (condition 2 is true and condition 1 is true), the MCLAG timing control engine 132-2 changes (at 818) a clock role of the secondary BTC 104-2 to the hybrid transparent time clock role for processing the delay-request message. In some examples, the MCLAG timing control engine 132-2 can send a hybrid transparent time clock role indication to the time protocol engine 130-2 to change the clock role of the time protocol engine 130-2. This hybrid transparent time clock role indication causes the time protocol engine 130-2 to process the delay-request message in a way that a transparent time clock would process the delay-request message.

In response to the hybrid transparent time clock role indication, the time protocol engine 130-2 updates (at 820) a correction field in the delay-request message with a resident time of the delay-request message in the secondary BTC 104-2. The resident time is the difference between the egress time of the updated delay-request message (with the correction field updated) (as transmitted from the secondary BTC 104-2 to the peer primary BTC 104-1 over the inter-device link 122) and the ingress time of the delay-request message (as received at the secondary BTC 104-2).

The secondary BTC 104-2 sends (at 822) the updated delay-request message to the peer primary BTC 104-1 over the inter-device link 122. In response to receiving the updated delay-request message over the inter-device link 122, the primary BTC 104-1 performs a process depicted in FIG. 9, in accordance with some examples of the present disclosure.

Figure 9:
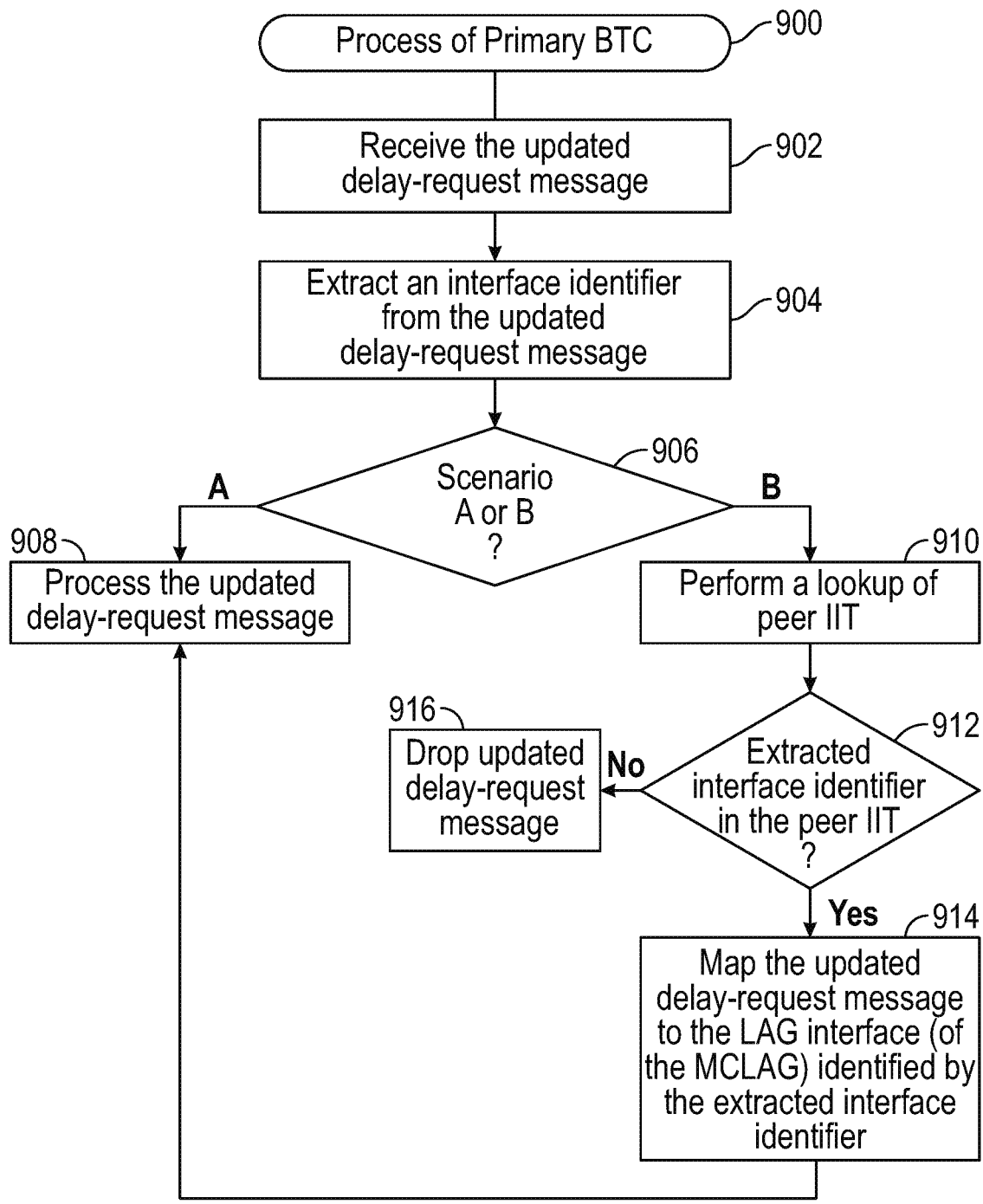
FIG. 9 is a flow diagram of a process of a primary boundary time clock, according to further examples.

FIG. 9 is a flow diagram of an example process 900 performed by the primary BTC 104-1 for addressing Issue 5. Although FIG. 9 shows a specific sequence of tasks, in other examples, the tasks can be performed in a different order, some tasks may be omitted, and/or other tasks may be added.

The primary BTC 104-1 receives (at 902) the updated delay-request message over the inter-device link 122 from the secondary BTC 104-2 (e.g., the updated delay-request message sent by the secondary BTC 104-2 at 822 in FIG. 8). There are two possible scenarios (A and B) associated with the delay-request message received over the inter-device link 122. In scenario A, the delay-request message originated from (was generated by) the peer secondary BTC 104-2 (in its role as a clock sink over the inter-device link 122). In scenario A, the delay-request message originated by the secondary BTC 104-2 was not received from an external clock sink (e.g., an ordinary time clock 114 in a client device 112). In scenario B, the delay-request message was received by the peer secondary BTC 104-2 from the external clock sink and forwarded by the peer secondary BTC 104-2 to the primary BTC 104-1 after the correction field of the delay-request message is updated at the secondary BTC 104-2.

The MCLAG timing control engine 132-1 of the primary BTC 104-1 extracts (at 904) an interface identifier (e.g., portIdentity of the PTP) as extracted from a header of the updated delay-request message.

Based on the extracted interface identifier, the MCLAG timing control engine 132-1 determines (at 906) which of scenarios A and B is applicable. The determination (at 906) is based on a comparison of the extracted interface identifier (as extracted from the delay-request message to a stored interface identifier that identifies an interface of the secondary device 102-2 including the secondary BTC 104-2 from which the primary BTC 104-1 previously received a timing message (e.g., an announce message). As noted above, the primary BTC 104-1 and the secondary BTC 104-2 may exchange announce messages to select a clock source and a clock sink over the inter-device link 122. An announce message has a header that includes an interface identifier. For example, the header of the announce message sent by the secondary BTC 104-2 includes an interface identifier of the interface (port) of the secondary device 102-2 from which the announce message is sent. The primary BTC 104-1 can record this interface identifier of the announce message as the stored interface identifier compared at 904.

If the extracted interface identifier from the delay-request message matches the stored interface identifier, the MCLAG timing control engine 132-1 determines that scenario A is applicable (i.e., the delay-request message originated from the secondary BTC 104-2). If scenario A is applicable, the MCLAG timing control engine 132-1 causes the time protocol engine 130-1 of the primary BTC 104-1 to process (at 908) the updated delay-request message for the purpose of responding with a delay-response message to the peer secondary BTC 104-2 over the inter-device link 122.

If scenario B is applicable, the MCLAG timing control engine 132-1 performs a lookup (at 910) of the peer IIT 604-1 (which is a copy of the local IIT 602-2) to identify which MCLAG (the "identified MCLAG") is to be used for responding to the external clock sink. If multiple access-side MCLAGs are present between the MCLAG logical device 102 and the access device 116 (or multiple access devices), then the identified MCLAG is one of the multiple access-side MCLAGs.

The lookup of the peer IIT 604-1 includes a search to determine (at 912) whether any entry of the peer IIT 604-1 includes the extracted interface identifier as extracted from the delay-request message received over the inter-device link 122.

If the MCLAG timing control engine 132-1 determines (at 912) that a match of the extracted interface identifier is found in an entry of the peer IIT 604-1, the MCLAG timing control engine 132-1 maps (at 914) the updated delay-request message to the LAG interface (of the MCLAG) identified by the extracted interface identifier, which is the LAG interface connected to a network link of the identified MCLAG. The MCLAG timing control engine 132-1 causes the time protocol engine 130-1 to process (at 908) the updated delay-request message and respond with a delay-response message sent over the LAG interface to the external clock sink.

If the MCLAG timing control engine 132-1 determines (at 912) that a match of the extracted interface identifier is not found in any entry of the peer IIT 604-1, the MCLAG timing control engine 132-1 drops (at 916) the delay-request message.

By using the various example implementations discussed above, boundary time clocks in the MCLAG logical device 102 can maintain accurate and stable time synchronization with one or more other time clocks, while supporting an MCLAG(s). The various example implementations do not rely on new timing messages or new information elements of timing messages. A "new" timing message or a new information element refers to a timing message or information element not currently defined by the time synchronization protocol, such as the PTP.

The various example implementations can work with time clocks that employ either end-to-end and peer-to-peer delay-mechanisms. Also, the various example implementations can be employed with 1-step and 2-step time clocks.

Further Examples

Figure 10:
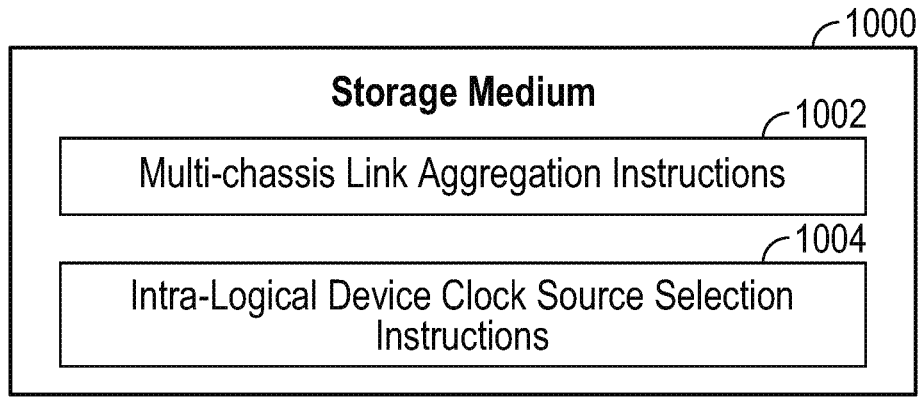
FIG. 10 is a block diagram of a storage medium storing machine-readable instructions according to some examples.

FIG. 10 is a block diagram of a non-transitory machine-readable or computer-readable storage medium 1000 storing machine-readable instructions that upon execution cause a system including a first electronic device and a second electronic device to perform various tasks. As examples, the first electronic device can be the primary device 102-1 of FIG. 1, and the second electronic device can be the secondary device 102-2 of FIG. 1. The system including the first and second electronic devices can be the MCLAG logical device 102 of FIG. 1, for example. Alternatively, the system can be a larger system that includes additional components.

The machine-readable instructions include multi-chassis link aggregation instructions 1002 to provide multi-chassis link aggregation by the first and second electronic devices that are part of a logical device supporting an MCLAG. The first electronic device includes a first time clock (e.g., the primary BTC 104-1 of FIG. 1), and the second electronic device includes a second time clock (e.g., the secondary BTC 104-2 of FIG. 1).

The machine-readable instructions include intra-logical device clock source selection instructions 1004 to perform, between the first and second time clocks over a link between the first and second electronic devices of the logical device, a clock source selection process to select one of the first and second time clocks as a clock source and another one of the first and second time clocks as a clock sink as part of a time synchronization process in the system. The clock source selection process can be a best clock source algorithm, such as the PTP BMCA, as depicted in FIG. 3, for example. The ability to perform the intra-logical device clock source selection allows one of the time clocks of an MCLAG logical device to be designated a clock source, and the other one of the time clocks of the MCLAG logical device to be designated a clock sink.

Based on a selection of the first time clock by the clock source selection process as the clock sink, the first time clock refrains from sending, by the first time clock, a timing message for a time synchronization process to a time clock external of the logical device. The timing message can be a message (e.g., an announce message) used for a clock source selection process between a time clock in the logical device and the time clock external of the logical device. Alternatively, the timing message is a message (e.g., a synchronization message or a follow-up message) used for a determination of a time offset between a time clock in the logical device and the time clock external of the logical device. As a result, the time clocks of the MCLAG logical device do not send redundant timing messages, which addresses Issue 1 or 3 discussed above.

In some examples, based on execution of the machine-readable instructions, the first time clock is a first boundary time clock, and the second time clock is a second boundary time clock. The first and second boundary time clocks can perform time synchronization processes with at least one further time clock that is external of the logical device. The first boundary time clock receives a first timing message from an external clock sink (e.g., a delay-request message from an ordinary time clock 114 of a client device 112). The first boundary time clock determines whether the second boundary time clock is a clock source for the first boundary time clock. Based on determining that the second boundary time clock is the clock source for the first boundary time clock, the first boundary time clock forwards (e.g., 822 in FIG. 8) the first timing message from the first boundary time clock to the second boundary time clock over the link between the first and second electronic devices of the logical device. If the first timing message handled in the manner above is a delay-request message, then Issue 5 is addressed.

In some examples, based on execution of the machine-readable instructions, the first boundary time clock determines whether the second boundary time clock has an operational link state to an MCLAG. The forwarding of the first timing message from the first boundary time clock to the second boundary time clock over the link is further based on determining (e.g., 816 in FIG. 8) that the second boundary time clock has an operational link state to an MCLAG.

In some examples, based on determining that the second boundary time clock is the clock source for the first boundary time clock, a clock role of the first boundary time clock is changed (e.g., 818 in FIG. 8) from a boundary time clock role to the hybrid transparent time clock role. The forwarding of the first timing message from the first boundary time clock to the second boundary time clock over the link occurs in the hybrid transparent time clock role.

In some examples, based on determining that the second boundary time clock is the clock source for the first boundary time clock, the first time clock updates (e.g., 820 in FIG. 8) a header field (e.g., a correction field) of the first timing message with time information based on an ingress time of the first timing message at the first electronic device and an egress time of the first timing message as forwarded from the first electronic device to the second electronic device. The first timing message forwarded from the first boundary time clock to the second boundary time clock includes the updated header field.

In some examples, the second boundary time clock receives (e.g., 902 in FIG. 9) the first timing message forwarded from the first boundary time clock over the link, and the second boundary clock determines (e.g., 906 in FIG. 9) whether the first timing message was received at the first boundary time clock from the external clock sink.

In some examples, the determining of whether the first timing was received at the first boundary time clock from the external clock sink includes determining whether an interface identifier (e.g., portIdentity of the PTP) extracted from the first timing message matches an interface identifier of an interface of the first electronic device with which the second boundary time clock has exchanged a timing message.

In some examples, based on determining, at the second boundary time clock, that the first timing message was received at the first boundary time clock from the external clock sink, the second boundary time clock accesses an interface identifier data structure (e.g., lookup of the peer IIT performed at 910 in FIG. 9) for the first boundary time clock to identify the MCLAG. Based on the identification of the MCLAG using the interface identifier data structure, the second boundary time clock processes the first timing message at the second boundary time clock, and sends a second timing message (e.g., a delay-response message) responsive to the first timing message (e.g., a delay-request message) over the MCLAG to the external clock sink.

In some examples, based on execution of the machine-readable instructions, the first time clock receives a timing message (e.g., a delay-response message) from an external clock source (e.g., the grand clock source 108). The first time clock (e.g., 104-2) checks a data structure for the second time clock (e.g., the foreign clock source table 142-1) to determine whether the second time clock (e.g., 104-1) has previously identified the external clock source. Based on determining that the second time clock has previously identified the external clock source, the first time clock forwards the timing message from the first time clock to the second time clock over the link. This ability can address Issue 4 discussed above.

Figure 11:
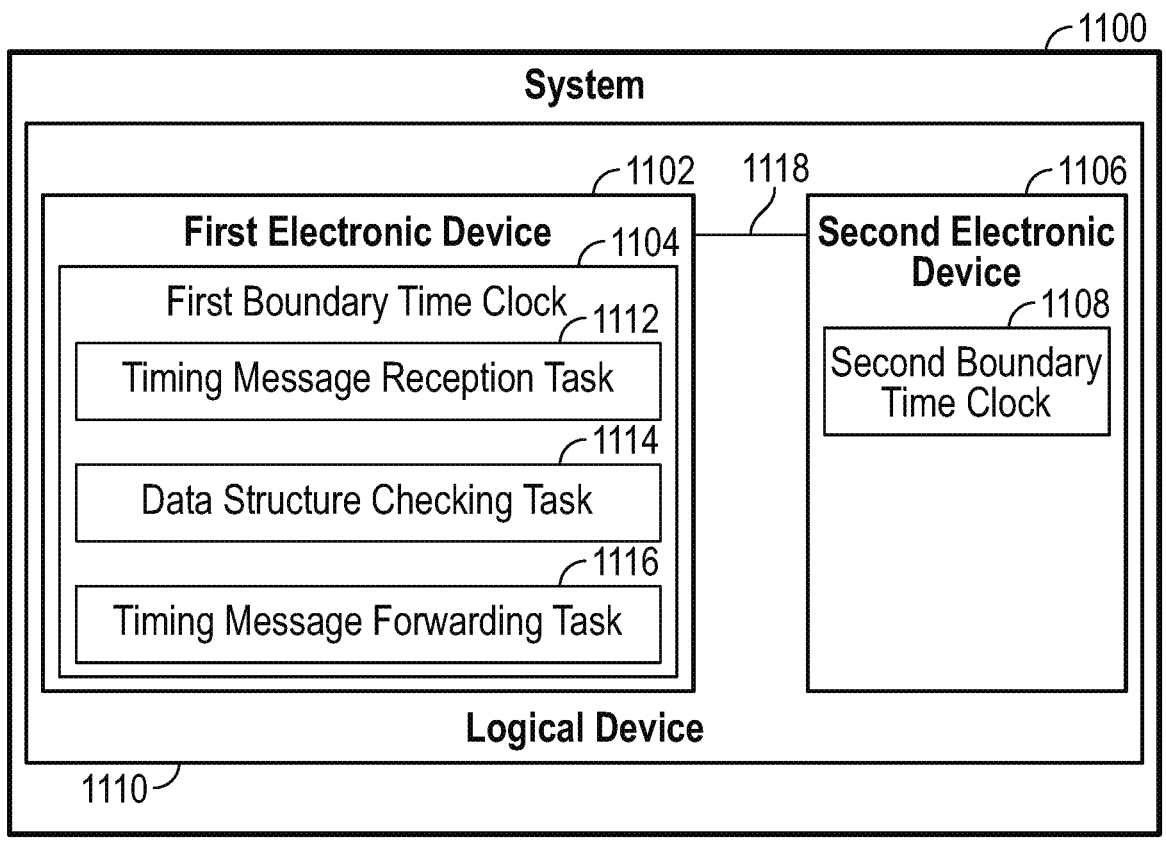
FIG. 11 is a block diagram of a system according to some examples.

FIG. 11 is a block diagram of a system 1100 including a first electronic device 1102 that has a first boundary time clock 1104, and a second electronic device 1106 that has a second boundary time clock 1108. The first and second electronic devices 1102 and 1106 are part of a logical device 1110 supporting an MCLAG. The logical device 1110 can be the MCLAG logical device 102 of FIG. 1, for example. The first and second boundary time clocks 1104 and 1108 perform time synchronization processes with at least one further time clock that is external of the logical device 1110.

The first boundary time clock 1104 can perform various tasks. The tasks include a timing message reception task 1112 to receive (e.g., 402 in FIG. 4 or 602 in FIG. 6) a timing message (e.g., a synchronization message, a follow-up message, or a delay-response message) from a clock source.

The tasks include a data structure checking task 1114 to check (e.g., 410 in FIG. 4 or 610 in FIG. 6) a data structure (e.g., a peer foreign clock source table) for the second boundary time clock 1108 to determine whether the second boundary time clock 1108 has previously identified the clock source.

The tasks include a timing message forwarding task 1116 to, based on determining that the second boundary time clock 1108 has previously identified the clock source, forward (e.g., 418 in FIG. 4 or 616 in FIG. 6) the timing message or an indication of receipt of the timing message from the first boundary time clock 1104 to the second boundary time clock 1108 over a link 1118 between the first and second electronic devices 1102 and 1106 of the logical device 1110.

In some examples, based on determining that the second boundary time clock has previously identified the clock source, the first boundary time clock 1104 can change a clock role (e.g., 414 in FIG. 4 or 616 in FIG. 6) of the first boundary time clock 1104 to the hybrid transparent time clock role.

In some examples, responsive to changing the clock role of the first boundary time clock 1104 to the hybrid transparent time clock role, the first boundary time clock 1104 forwards the timing message over the link 1118 to the second boundary time clock 1108.

In some examples, in response to receiving the timing message at the second boundary time clock 1108 from the first boundary time clock 1104, the second boundary time clock 1108 extracts (e.g., 504 in FIG. 5 or 704 in FIG. 7) a source interface identifier (e.g., sourcePortIdentity according to the PTP) from the timing message.

In some examples, the second boundary time clock 1108 determines (e.g., 506 in FIG. 5 or 706 in FIG. 7) whether the extracted source interface identifier is present in a local foreign clock source table. If not, the second boundary time clock 1108 drops the timing message. If the extracted source interface identifier is present in the local foreign clock source table, the second boundary time clock 1108 maps the timing message to a given LAG interface, and processes the timing message that includes responding through the given LAG interface.

In further examples, the timing message is a synchronization message. Based on determining that the second boundary time clock has previously identified the clock source, the first boundary time clock 1104 forwards an indication of receipt of the synchronization message to the second boundary time clock 1106. The first boundary time clock 1104 changes its clock role from a clock sink role to a clock source role. The first boundary time clock 1104 receives, from the second boundary time clock 1106 responsive to the indication, an announce message corresponding to the synchronization message. The first boundary time clock 1104 maps the announce message to the corresponding LAG interface (of an MCLAG) at which the synchronization message was received at the first boundary time clock 1104.

The first boundary time clock 1104 then processes (consumes) the synchronization message.

Figure 12:
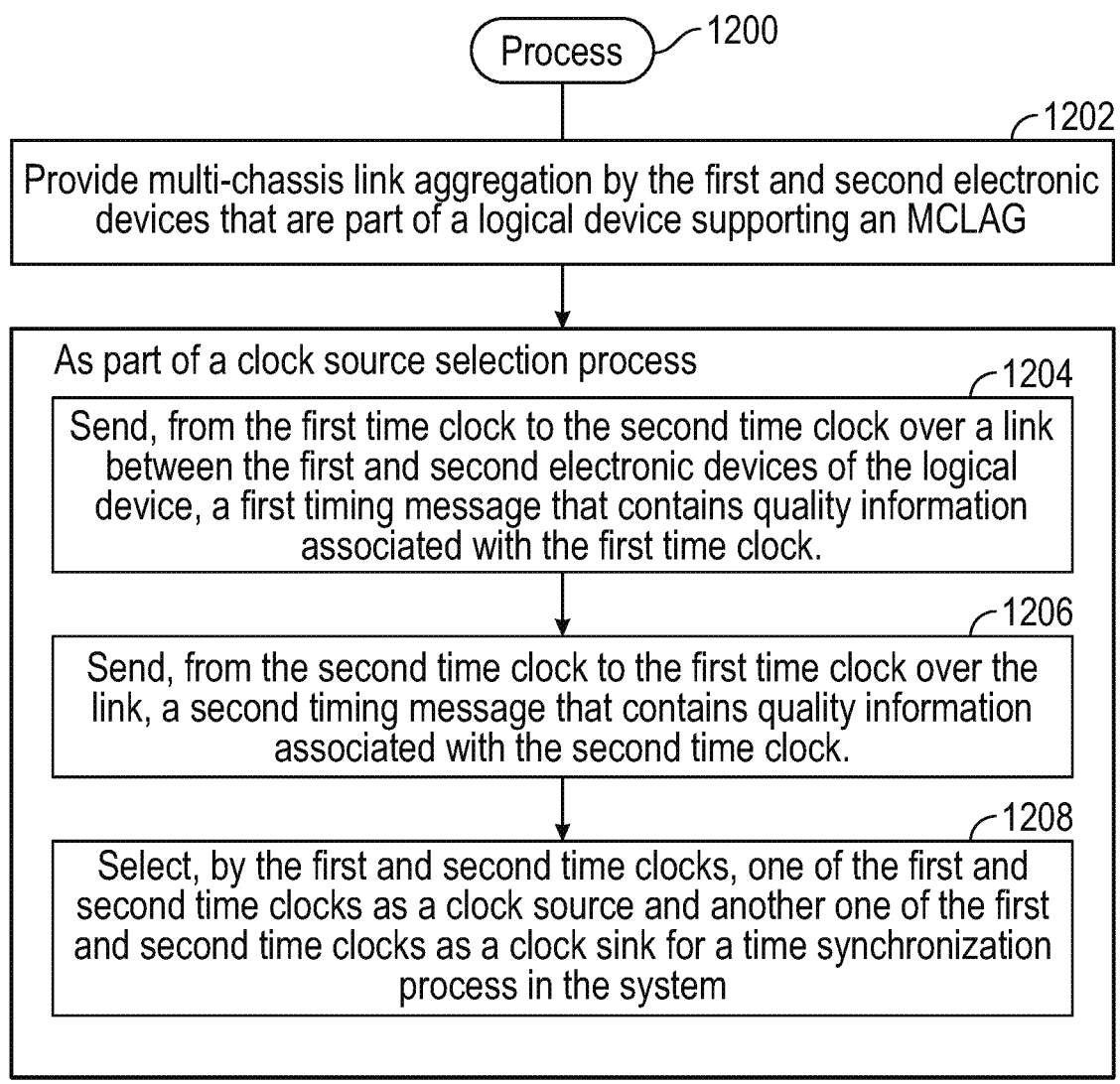
FIG. 12 is a flow diagram of a process according to some examples.

FIG. 12 is a flow diagram of a process 1200 that can be performed by a system including a first electronic device and a second electronic device. The process 1200 includes providing (at 1202) multi-chassis link aggregation by the first and second electronic devices that are part of a logical device supporting an MCLAG. The first electronic device includes a first time clock, and the second electronic device includes a second time clock. The MCLAG includes a first set of network links connected to the first electronic device, and a second set of network links connected to the second electronic device.

As part of a clock source selection process, the process 1200 includes sending (at 1204), from the first time clock to the second time clock over a link between the first and second electronic devices of the logical device, a first timing message that contains quality information associated with the first time clock. The first timing message can be a first announce message.

As part of the clock source selection process, the process 1200 includes sending (at 1206), from the second time clock to the first time clock over the link, a second timing message that contains quality information associated with the second time clock. The second timing message can be a second announce message.

As part of the clock source selection process, the process 1200 includes selecting (at 1208), by the first and second time clocks, one of the first and second time clocks as a clock source and another one of the first and second time clocks as a clock sink for a time synchronization process in the system.

In further examples, a system includes a first electronic device and a second electronic device. The system provides multi-chassis link aggregation by the first and second electronic devices that are part of a logical device supporting an MCLAG. The first electronic device includes a first time clock, and the second electronic device includes a second time clock. The first and second time clocks perform, over a link between the first and second electronic devices of the logical device, a clock source selection process to select one of the first and second time clocks as a clock source and another one of the first and second time clocks as a clock sink as part of a time synchronization process in the system.

In further examples, a non-transitory machine-readable or computer-readable storage medium stores machine-readable instructions that upon execution cause a system including a first electronic device and a second electronic device to perform various tasks. The first electronic device includes a first boundary time clock, and the second electronic device includes a second boundary time clock. The first and second electronic devices are part of a logical device supporting an MCLAG. The first and second boundary time clocks are to perform time synchronization processes with at least one further time clock that is external of the logical device. The time synchronization processes include exchanges of timing messages. The machine-readable instructions upon execution cause the first time clock to receive a timing message from a clock source, check a data structure for the second boundary time clock to determine whether the second boundary time clock has previously identified the clock source, and based on determining that the second boundary time clock has previously identified the clock source, forward the timing message from the first boundary time clock to the second boundary time clock over a link between the first and second electronic devices of the logical device.

In further examples, a process is performed by a system including a first electronic device and a second electronic device, where the first electronic device includes a first boundary time clock, and the second electronic device includes a second boundary time clock, and the first and second electronic devices are part of a logical device supporting an MCLAG. The process includes receiving, by the first boundary time clock, a timing message from a clock source, and checking, by the first boundary time clock, a data structure for the second boundary time clock to determine whether the second boundary time clock has previously identified the clock source. Based on determining that the second boundary time clock has previously identified the clock source, the process includes forwarding the timing message from the first boundary time clock to the second boundary time clock over a link between the first and second electronic devices of the logical device.

A storage medium (e.g., 1000 in FIG. 10) can include any or some combination of the following: a semiconductor memory device such as a DRAM or SRAM, an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disk (CD) or a digital video disk (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the present disclosure, use of the term "a," "an," or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions that upon execution cause a system comprising a first electronic device and a second electronic device to:

provide multi-chassis link aggregation by the first and second electronic devices that are part of a logical device supporting a multi-chassis link aggregation group (MCLAG), wherein the first electronic device comprises a first boundary time clock, and the second electronic device comprises a second boundary time clock; and perform, between the first and second boundary time clocks over a link between the first and second electronic devices of the logical device, a clock source selection process to select one of the first and second boundary time clocks as a clock source and another one of the first and second boundary time clocks as a clock sink as part of a time synchronization process in the system;

perform, by the first and second boundary time clocks, time synchronization processes with at least one further time clock that is external of the logical device, the time synchronization processes comprising exchanges of timing messages;

receive, at the first boundary time clock, a first timing message from an external clock sink;

determine, at the first boundary time clock, whether the second boundary time clock is a clock source for the first boundary time clock; and based on determining that the second boundary time clock is the clock source for the first boundary time clock, forward the first timing message from the first boundary time clock to the second boundary time clock over the link between the first and second electronic devices of the logical device.

2. The non-transitory machine-readable storage medium of claim 1, wherein the instructions upon execution cause the system to:

determine, at the first boundary time clock, whether the second boundary time clock has an operational link state to an MCLAG, wherein the forwarding of the first timing message from the first boundary time clock to the second boundary time clock over the link is further based on determining that the second boundary time clock has an operational link state to an MCLAG.

3. The non-transitory machine-readable storage medium of claim 1, wherein the determining, at the first boundary time clock, of whether the second boundary time clock is the clock source for the first boundary time clock is based on a clock role indicator of the first boundary time clock, the clock role indicator set by the clock source selection process.

4. The non-transitory machine-readable storage medium of claim 1, wherein the instructions upon execution cause the system to:

based on determining that the second boundary time clock is the clock source for the first boundary time clock, change a clock role of the first boundary time clock from a boundary time clock role to a hybrid transparent time clock role, wherein the forwarding of the first timing message from the first boundary time clock to the second boundary time clock over the link occurs in the hybrid transparent time clock role.

5. The non-transitory machine-readable storage medium of claim 1, wherein the instructions upon execution cause the system to:

based on determining that the second boundary time clock is the clock source for the first boundary time clock, update a header field of the first timing message with time information based on an ingress time of the first timing message at the first electronic device and an egress time of the first timing message as forwarded from the first electronic device to the second electronic device, wherein the first timing message forwarded from the first boundary time clock to the second boundary time clock includes the updated header field.

6. The non-transitory machine-readable storage medium of claim 5, wherein the time information is based on a difference between the egress time and the ingress time.

7. The non-transitory machine-readable storage medium of claim 1, wherein the instructions upon execution cause the system to:

receive, at the second boundary time clock, the first timing message forwarded from the first boundary time clock over the link; and determine, at the second boundary time clock, whether the first timing message was received at the first boundary time clock from the external clock sink.

8. The non-transitory machine-readable storage medium of claim 7, wherein the determining of whether the first timing message was received at the first boundary time clock from the external clock sink comprises:

determining whether an interface identifier extracted from the first timing message matches an interface identifier of an interface of the first electronic device with which the second boundary time clock has exchanged a timing message.

9. The non-transitory machine-readable storage medium of claim 7, wherein the instructions upon execution cause the system to:

based on determining, at the second boundary time clock, that the first timing message was received at the first boundary time clock from the external clock sink, access an interface identifier data structure for the first boundary time clock to identify the MCLAG; and based on the identification of the MCLAG using the interface identifier data structure, process the first timing message at the second boundary time clock, and send a second timing message responsive to the first timing message over the MCLAG to the external clock sink.

10. The non-transitory machine-readable storage medium of claim 9, wherein the first timing message is a delay-request message used to compute a time offset between the external clock sink and a boundary time clock of the logical device, wherein the instructions upon execution cause the system to:

update the interface identifier data structure responsive to receipt of delay-request messages as part of a learning process to track mappings of external clock sinks to one or more MCLAGs.

11. The non-transitory machine-readable storage medium of claim 1, wherein the first timing message comprises a Delay-Request message according to a Precision Time Protocol (PTP).

12. The non-transitory machine-readable storage medium of claim 1, wherein the instructions upon execution cause the system to:

based on a selection of the first boundary time clock by the clock source selection process as the clock sink, refrain from sending, by the first boundary time clock, a timing message for a time synchronization process to a time clock external of the logical device.

13. The non-transitory machine-readable storage medium of claim 12, wherein the timing message is a message used for a clock source selection process between a time clock in the logical device and the time clock external of the logical device.

14. The non-transitory machine-readable storage medium of claim 12, wherein the timing message is a message used for a determination of a time offset between a time clock in the logical device and the time clock external of the logical device.

15. A method of a system comprising a first electronic device and a second electronic device, the method comprising:
- providing multi-chassis link aggregation by the first and second electronic devices that are part of a logical device supporting a multi-chassis link aggregation group (MCLAG), wherein the first electronic device comprises a first time clock, and the second electronic device comprises a second time clock, wherein the MCLAG comprises a first set of network links connected to the first electronic device, and a second set of network links connected to the second electronic device; and
- as part of a clock source selection process:
  - sending, from the first time clock to the second time clock over a link between the first and second electronic devices of the logical device, a first timing message that contains quality information associated with the first time clock,
  - sending, from the second time clock to the first time clock over the link, a second timing message that contains quality information associated with the second time clock, and
  - selecting, by the first and second time clocks, one of the first and second time clocks as a clock source and another one of the first and second time clocks as a clock sink for a time synchronization process in the system.

16. The method of claim 15, wherein the first timing message comprises a first announce message of a Precision Time Protocol (PTP), and the second timing message comprises a second announce message of the PTP.

17. A non-transitory machine-readable storage medium comprising instructions that upon execution cause a system comprising a first electronic device and a second electronic device to:
- provide multi-chassis link aggregation by the first and second electronic devices that are part of a logical device supporting a multi-chassis link aggregation group (MCLAG), wherein the first electronic device comprises a first time clock, and the second electronic device comprises a second time clock; and
- perform, between the first and second time clocks over a link between the first and second electronic devices of the logical device, a clock source selection process to select one of the first and second time clocks as a clock source and another one of the first and second time clocks as a clock sink as part of a time synchronization process in the system; and
- based on a selection of the first time clock by the clock source selection process as the clock sink, refrain from sending, by the first time clock, a timing message for a time synchronization process to a time clock external of the logical device.

\* \* \* \* \*